US011530700B2

(12) United States Patent
Kataoka et al.

(10) Patent No.: US 11,530,700 B2
(45) Date of Patent: Dec. 20, 2022

(54) ELECTRIC OIL PUMP

(71) Applicant: Nidec Tosok Corporation, Zama (JP)

(72) Inventors: Shigehiro Kataoka, Zama (JP); Yoshiyuki Kobayashi, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 293 days.

(21) Appl. No.: 16/790,770

(22) Filed: Feb. 14, 2020

(65) Prior Publication Data

US 2020/0309119 A1    Oct. 1, 2020

(30) Foreign Application Priority Data

Mar. 28, 2019   (JP) .............................. JP2019-063897

(51) Int. Cl.
| | | |
|---|---|---|
| *F04C 14/00* | (2006.01) | |
| *F04C 15/00* | (2006.01) | |
| *H02K 11/30* | (2016.01) | |
| *H02K 11/33* | (2016.01) | |
| *H02K 11/21* | (2016.01) | |

(52) U.S. Cl.
CPC .......... *F04C 14/00* (2013.01); *F04C 15/0057* (2013.01); *H02K 11/21* (2016.01); *H02K 11/30* (2016.01); *H02K 11/33* (2016.01); *F04C 2210/14* (2013.01); *F04C 2240/10* (2013.01); *F04C 2240/20* (2013.01); *F04C 2240/40* (2013.01); *F04C 2240/60* (2013.01); *F04C 2240/803* (2013.01); *F04C 2240/81* (2013.01)

(58) Field of Classification Search
CPC .. F04C 14/00; F04C 15/0057; F04C 2210/14; F04C 2240/10; F04C 2240/20; F04C 2240/40; F04C 2240/60; F04C 2240/803; F04C 2240/81; F04C 28/08; F04C 2240/403; F04C 2240/808; F04C 2/102; H02K 11/21; H02K 11/30; H02K 11/33
USPC ....................................................... 310/68 B
See application file for complete search history.

(56) References Cited

U.S. PATENT DOCUMENTS

| | | | | |
|---|---|---|---|---|
| 6,577,029 | B1* | 6/2003 | Weber ..................... | H02K 23/66 310/68 B |
| 6,664,698 | B1* | 12/2003 | Tasch ...................... | B60J 7/0573 310/239 |
| 2015/0008803 | A1* | 1/2015 | Furukawa .............. | H02K 5/161 310/68 D |
| 2015/0216083 | A1* | 7/2015 | Kanazawa ............. | H02K 11/33 361/717 |

(Continued)

FOREIGN PATENT DOCUMENTS

| | | |
|---|---|---|
| JP | 2012-092725 A | 5/2012 |
| JP | 5969342 B2 | 8/2016 |

*Primary Examiner* — John K Kim
(74) *Attorney, Agent, or Firm* — Keating & Bennett

(57) ABSTRACT

A board surface of a control board is disposed on an outward side of a motor in a radial direction in a posture along an axial direction. A rotation angle sensor is disposed on a rear side of a control board in the axial direction. A power supply input portion on the control board is disposed in an end portion on the rear side in the axial direction. A main body of a motor includes the control board and a wiring assembly electrically connecting a connector and the rotation angle sensor to each other. The wiring assembly includes a power supply input wiring, a sensor wiring, and a wiring holder holding the power supply input wiring and the sensor wiring.

4 Claims, 14 Drawing Sheets

(56) References Cited

U.S. PATENT DOCUMENTS

| | | | |
|---|---|---|---|
| 2015/0381016 A1* | 12/2015 | Tsuda | H02K 11/35 310/68 B |
| 2016/0233737 A1* | 8/2016 | Nakamura | H02K 11/33 |
| 2020/0309119 A1* | 10/2020 | Kataoka | F04C 14/00 |

* cited by examiner

ELECTRIC OIL PUMP

CROSS REFERENCE TO RELATED APPLICATION

The present invention claims priority under 35 U.S.C. § 119 to Japanese Application No. 2019-063897 filed on Mar. 28, 2019, the entire contents of which are hereby incorporated herein by reference.

1. FIELD OF THE DISCLOSURE

The present disclosure relates to an electric oil pump.

2. BACKGROUND

In the related art, electric oil pumps including a pump unit, a motor unit which drives the pump unit, a control board which has a drive circuit controlling driving of the motor unit, and a connector to which an external power supply is connected are known.

For example, an electric oil pump disclosed Japanese Patent No. 5969342 includes the pump unit, the motor unit, the control board, and the connector described above. A motor of the motor unit includes a main body portion having a rotor and a stator, and a shaft serving as a motor shaft. One side of the shaft in an axial direction protrudes from one side of the main body portion in the axial direction and is connected to the pump unit.

The electric oil pump disclosed in Japanese Patent No. 5969342 does not include a rotation angle sensor for detecting a rotation angle of the rotor. However, in general, a control board controls driving of a motor based on results of detection of a rotation angle by a rotation angle sensor.

As a technology in the related art utilizing results detected by a rotation angle sensor in controlling driving of a motor, an electric pump disclosed in Japanese Unexamined Patent Application Publication No. 2012-92725 is known. The electric pump disclosed in Japanese Unexamined Patent Application Publication No. 2012-92725 includes a motor case serving as a main body portion, and a motor shaft in a motor unit. One side of the motor shaft in an axial direction protrudes from one side of the motor case in the axial direction and is connected to a pump. Inside the motor case, a control board is fixed on the other side of a stator in the axial direction in a posture in which a board surface lies in a radial direction of the motor shaft. A rotation angle sensor is disposed inside the motor case. The rotation angle sensor is disposed inside the motor case at a position between the stator and the control board in the axial direction.

In the electric oil pump disclosed in Japanese Patent No. 5969342 as well, similar to the electric pump disclosed in Japanese Unexamined Patent Application Publication No. 2012-92725, the control board is disposed in a posture in which a board surface lies in the radial direction of the motor shaft.

Both an electric oil pump disclosed in Japanese Patent No. 5969342 and an electric pump disclosed in Japanese Unexamined Patent Application Publication No. 2012-92725 have a problem that they are increased in size in a radial direction due to a control board protruding significantly outward in the radial direction from a motor unit.

In addition, in the electric oil pump disclosed in Japanese Patent No. 5969342, if a rotation angle sensor is disposed in a layout similar to that of the electric pump disclosed in Japanese Unexamined Patent Application Publication No. 2012-92725, the following problem occurs. That is, the problem is that the control board needs to be detached from the motor unit such that the rotation angle sensor is exposed to the outside in order to perform maintenance and inspection of the rotation angle sensor, so that an operator is obliged to perform troublesome maintenance work on the rotation angle sensor.

SUMMARY

Example embodiments of the present disclosure provide electric oil pumps in each of which space saving in a radial direction is achieved and maintenance workability of a rotation angle sensor is improved.

According to an example embodiment of the present disclosure, an electric oil pump includes a pump, a motor to drive the pump, a control board including a drive circuit to control driving of the motor, and a connector to which an external power supply is connected. The motor includes a main body including a rotor and a stator, and a motor shaft. One side of the motor shaft in an axial direction protrudes from one side of the main body in the axial direction and is connected to the pump. The main body includes a rotation angle sensor to detect a rotation angle of the rotor. The control board includes a sensor connection portion electrically connected to the rotation angle sensor, a power supply input portion, and a motor power supply output portion and is disposed on an outward side of the motor unit in a radial direction in a posture in which any one surface of a first surface and a second surface of the control board lies in the axial direction. The rotation angle sensor is disposed on the other side of the control board in the axial direction. The power supply input portion is disposed in an end portion of the control board on the other side in the axial direction. The main body portion includes the control board and a wiring assembly electrically connecting the connector and the rotation angle sensor to each other. The wiring assembly includes a power supply input wiring connecting a terminal of the connector and the power supply input portion on the control board to each other, a sensor wiring connecting the rotation angle sensor and the sensor connection portion on the control board to each other, and a wiring holder molded into a predetermined shape and holding the power supply input wiring and the sensor wiring.

According to an example embodiment of the present disclosure, it is possible to realize an excellent effect in that space saving in a radial direction is achieved and maintenance workability of a rotation angle sensor is improved.

The above and other elements, features, steps, characteristics and advantages of the present disclosure will become more apparent from the following detailed description of the example embodiments with reference to the attached drawings.

DETAILED DESCRIPTION

Figure 1:
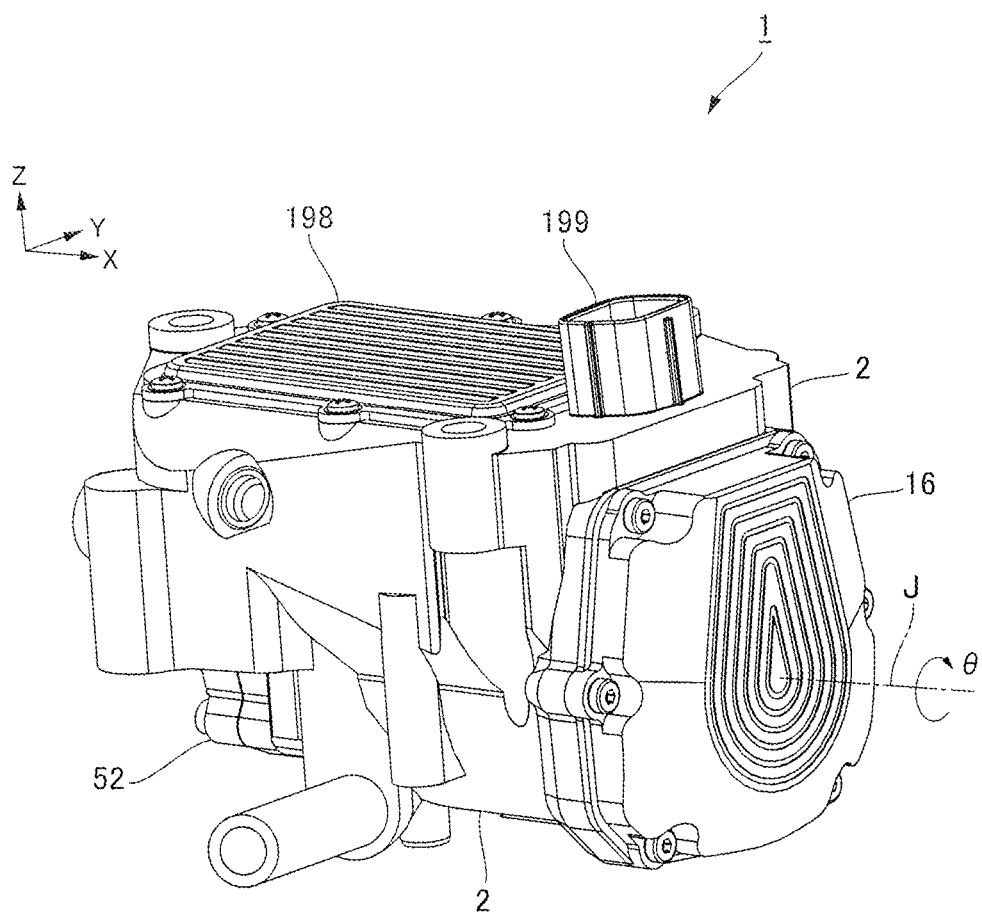
FIG. 1 is a perspective view illustrating an electric oil pump according to an example embodiment from a positive Z side in an XYZ coordinate system (a definition thereof will be given below).

Hereinafter, with reference to the drawings, electric oil pumps according to example embodiments of the present disclosure will be described. In the present example embodiment, an electric oil pump supplying oil to a transmission mounted in a vehicle such as an automobile will be described. In addition, in the following drawings, in order to make each constitution easy to understand, there are cases where actual structures may differ from respective structures in scale, number, and the like.

In addition, in the drawings, an XYZ coordinate system is suitably indicated as a three-dimensional orthogonal coordinate system. In the XYZ coordinate system, an X axis direction is a direction parallel to an axial direction of a central axis J illustrated in FIG. 1. The central axis J is a central axis line of a shaft (motor shaft) 13 of a motor unit 10, which will be described below. A Y axis direction is a direction parallel to a width direction of the electric oil pump illustrated in FIG. 1. A Z axis direction is a direction orthogonal to both the X axis direction and the Y axis direction. In all of the X axis direction, the Y axis direction, and the Z axis direction, sides directed by arrows illustrated in the diagrams are positive sides, and the opposite sides are negative sides.

In addition, in the following description, the positive side (positive X side) in the X axis direction will be described as "a rear side", and the negative side (negative X side) in the X axis direction will be described as "a front side". The rear side and the front side are simply names used for description and do not limit actual positional relationships or directions. The front side (negative X side) corresponds to one side in the present disclosure, and the rear side (positive X side) corresponds to the other side in the present disclosure. Unless otherwise specified, a direction (X axis direction) parallel to the central axis J will be simply described as "an axial direction", a radial direction about the central axis J will be simply described as "a radial direction", and a circumferential direction about the central axis J, that is, a direction (θ direction) around the central axis J will be simply described as "a circumferential direction".

In this specification, a state of extending in the axial direction includes a case of extending in a direction inclined within a range of less than 45° with respect to the axial direction, in addition to a case of strictly extending in the axial direction (X axis direction). In addition, in this specification, a state of extending in the radial direction includes a case of extending in a direction inclined within a range of less than 45° with respect to the radial direction, in addition to a case of strictly extending in the radial direction, that is, a direction perpendicular to the axial direction (X axis direction).

Example Embodiment

<Overall Constitution>

Figure 2:
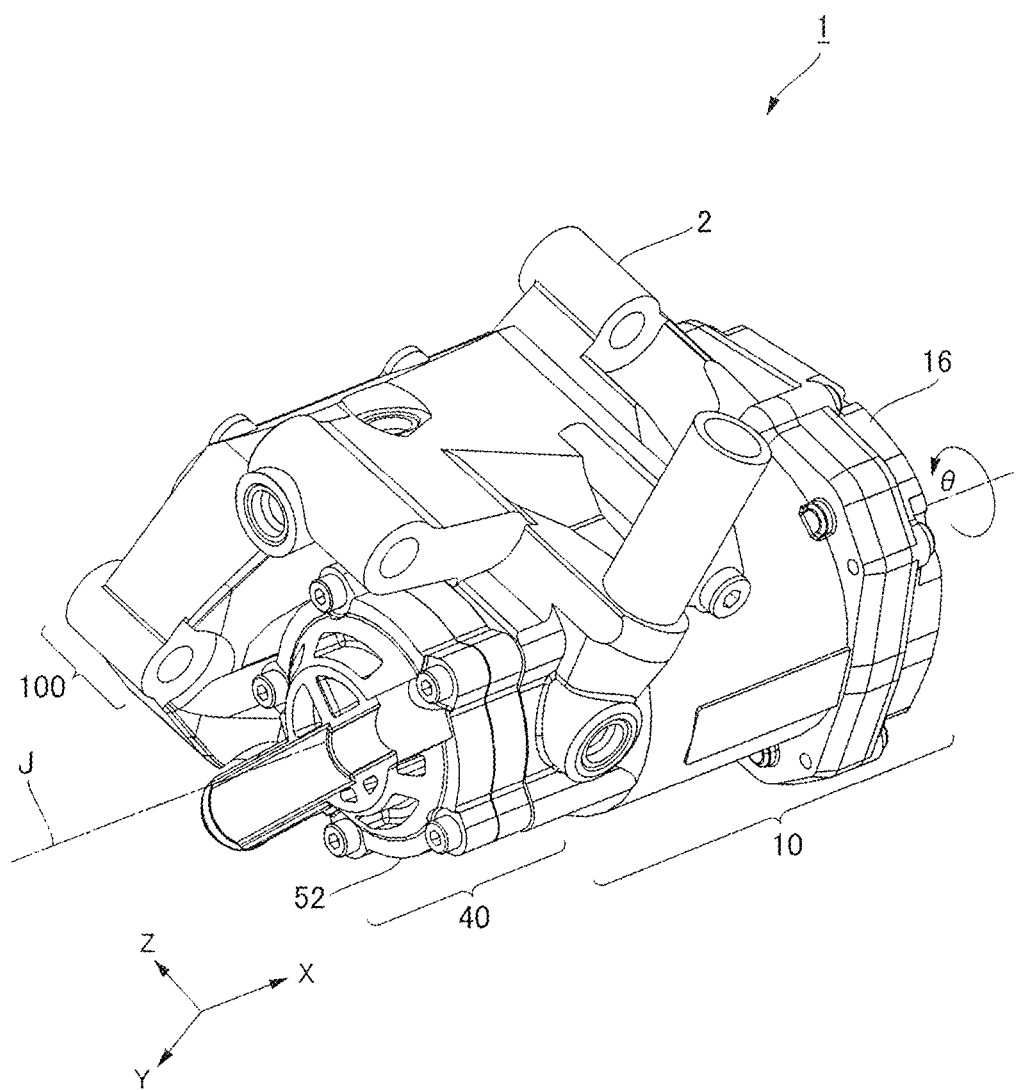
FIG. 2 is a perspective view illustrating the same electric oil pump from a negative Z side.

FIG. 1 is a perspective view illustrating an electric oil pump 1 according to the example embodiment from a positive Z side. FIG. 2 is a perspective view illustrating the electric oil pump 1 from a negative Z side. As illustrated in FIG. 2, the electric oil pump 1 includes a housing 2, the motor unit 10, a pump unit 40, and an inverter 100.

(Housing 2)

The housing 2 is constituted of a metal (for example, a metal including aluminum, magnesium, titanium, or the like) cast product or a resin (including a resin containing glass fibers, carbon, or the like) molded product. The housing 2 serves as a motor housing for the motor unit 10, a pump housing for the pump unit 40, and an inverter housing for the inverter 100. The motor housing for the motor unit 10, the pump housing for the pump unit 40, the inverter housing for the inverter 100 are a part of a single member.

A rotor accommodation portion accommodating a pump rotor (47 in FIG. 3) of the pump unit 40, and the motor housing for the motor unit 10 may be a part of a single member or may be separate bodies. In addition, the motor housing for the motor unit 10 and the pump housing for the pump unit 40 may be separate bodies.

As in the electric oil pump 1 according to the example embodiment, when the motor housing and the pump housing are a part of a single member, a boundary between the motor housing and the pump housing in the axial direction is defined as follows. That is, the center of a wall in the axial direction provided with a penetration hole through which a shaft (13 in FIG. 3) penetrates the wall from the inside of the motor housing toward the rotor accommodation portion of the pump housing is the boundary between both housings in the axial direction.

Figure 3:
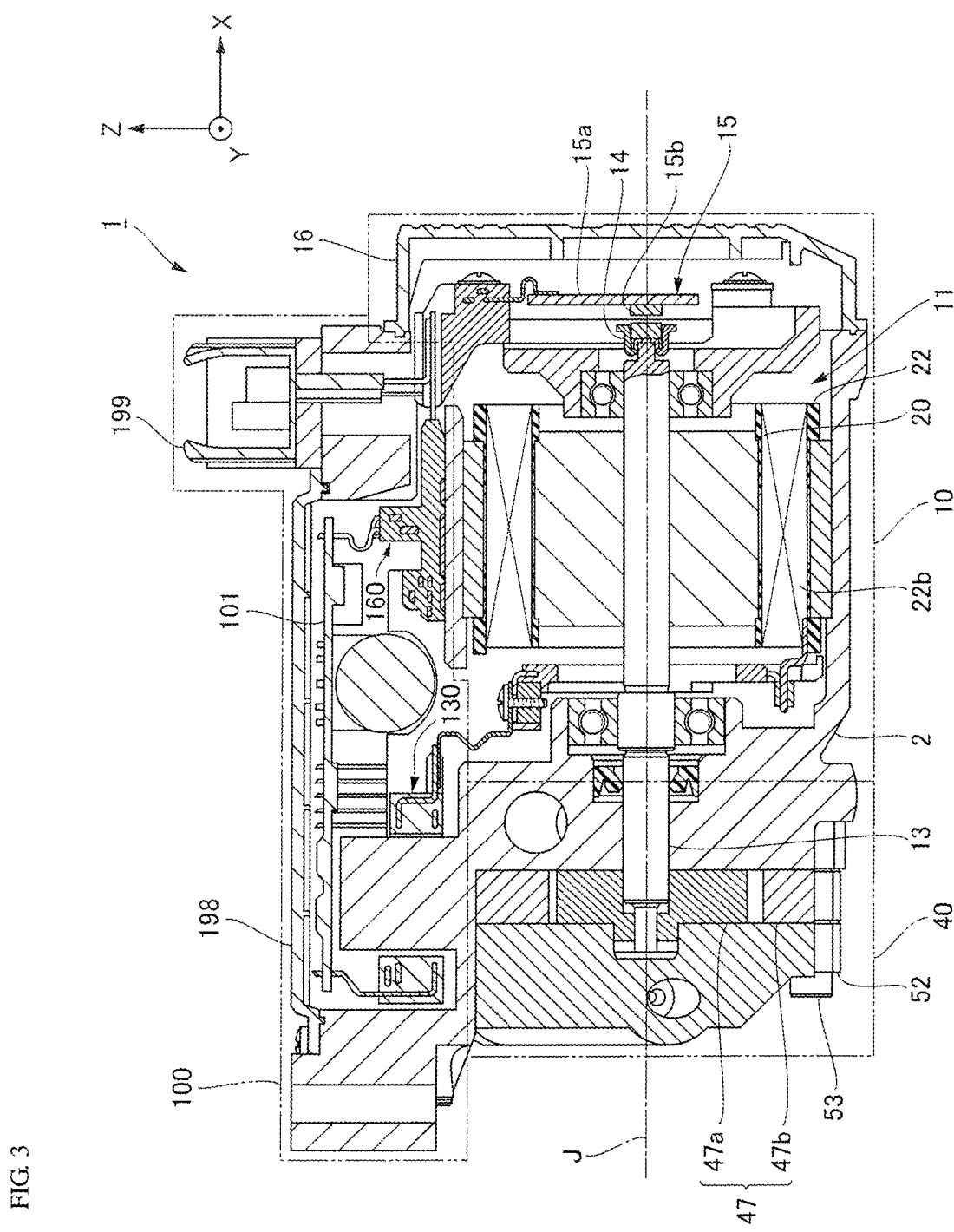
FIG. 3 is a cross-sectional view illustrating an X-Z cut surface of the same electric oil pump at a position of a central axis J.
Figure 4:
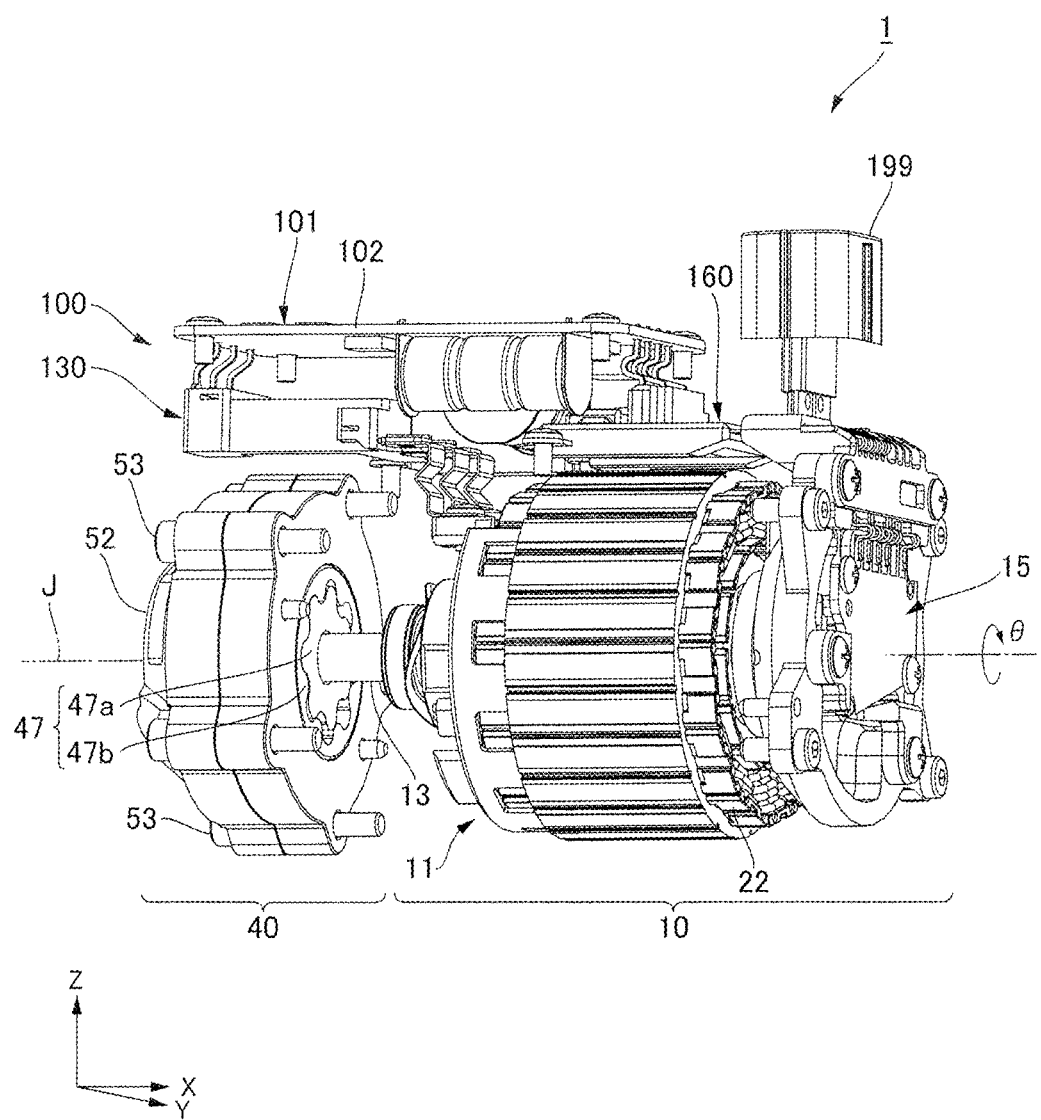
FIG. 4 is an exploded perspective view illustrating a part excluding a housing, a motor cover, a pump cover, and an inverter cover in the same electric oil pump from a rear side (definitions of a front side and a rear side will be given below) in an axial direction.

FIG. 3 is a cross-sectional view illustrating an X-Z cut surface of the electric oil pump 1 at a position of the central axis J. FIG. 4 is an exploded perspective view illustrating a part excluding the housing (2 in FIG. 1), a motor cover (16 in FIG. 1), a pump cover (52 in FIG. 1), and an inverter cover (198 in FIG. 1) in the electric oil pump 1 from the rear side in the axial direction.

<Motor Unit 10>

The motor unit 10 includes a motor 11 in the motor housing.

(Motor 11)

The motor 11 includes the shaft 13 disposed along the central axis J extending in the axial direction, a sensor magnet portion 14, a rotation angle sensor 15, the motor cover 16, a rotor 20, and a stator 22. The sensor magnet portion 14, the motor cover 16, and the rotor 20 are illustrated in only FIG. 3 of FIGS. 3 and 4.

The motor 11 is an inner rotor-type motor, for example. The rotor 20 is fixed to an outer circumferential surface of the shaft 13, and the stator 22 is disposed on an outward side of the rotor 20 in the radial direction. A part excluding the shaft 13 in the motor 11 is a main body portion of the motor 11. That is, the main body portion of the motor 11 is constituted of the rotor 20, the stator 22, the sensor magnet portion 14, the rotation angle sensor 15, the motor cover 16, and the like.

The rotor 20 is fixed in a region on the rear side (the other side) of the center of the shaft 13 in the axial direction, that is a region on the front side (one side) from an end on the rear side. The stator 22 is disposed in a form in which an inner circumferential surface faces an outer circumferential surface of the rotor 20.

In the shaft 13 serving as a motor shaft, the front side in the axial direction protrudes from an end of the stator 22 on the front side and is connected to the pump unit 40 (more specifically, a pump rotor 47 which will be described below).

The stator 22 includes a coil 22b. When the coil 22b is electrified, the shaft 13 and the rotor 20 fixed to the outer circumferential surface of the shaft 13 rotates.

As illustrated in FIG. 3, the sensor magnet portion 14 is fixed to an end portion of the shaft 13 on the rear side in the axial direction and rotates together with the shaft 13. A magnetic pole in one of two regions obtained by dividing the disk-shaped sensor magnet portion 14 at a position of the diameter is an S pole and a magnetic pole in the other region is an N pole.

The rotation angle sensor 15 is fixed to an end portion of the motor 11 on the rear side. In addition, the rotation angle sensor 15 includes a sensor substrate 15a and an MR element (magnetic sensor) 15b mounted in the sensor substrate 15a. The sensor substrate 15a is disposed in a posture in which a substrate surface of the sensor substrate 15a lies in the radial direction. The MR element 15b is at a position passing through the central axis J and faces the sensor magnet portion 14 in the axial direction. When the sensor magnet portion 14 rotates together with the shaft 13, magnetic forces of the S pole and the N pole detected by the MR element 15b change. The MR element 15b outputs a first signal H1, a second signal H2, and a third signal H3 in accordance with a detected magnetic force. A microcomputer of the inverter 100 identifies a rotation angle of the shaft 13 based on the first signal H1, the second signal H2, and the third signal H3 sent from the MR element 15b.

The housing 2 includes an opening directed to the rear side in the axial direction at an end on the rear side in the axial direction. The motor cover 16 is fixed to the housing 2 and blocks the opening described above. An operator can access the rotation angle sensor 15 of the motor 11 by detaching the motor cover 16 from the housing 2.

Figure 5:
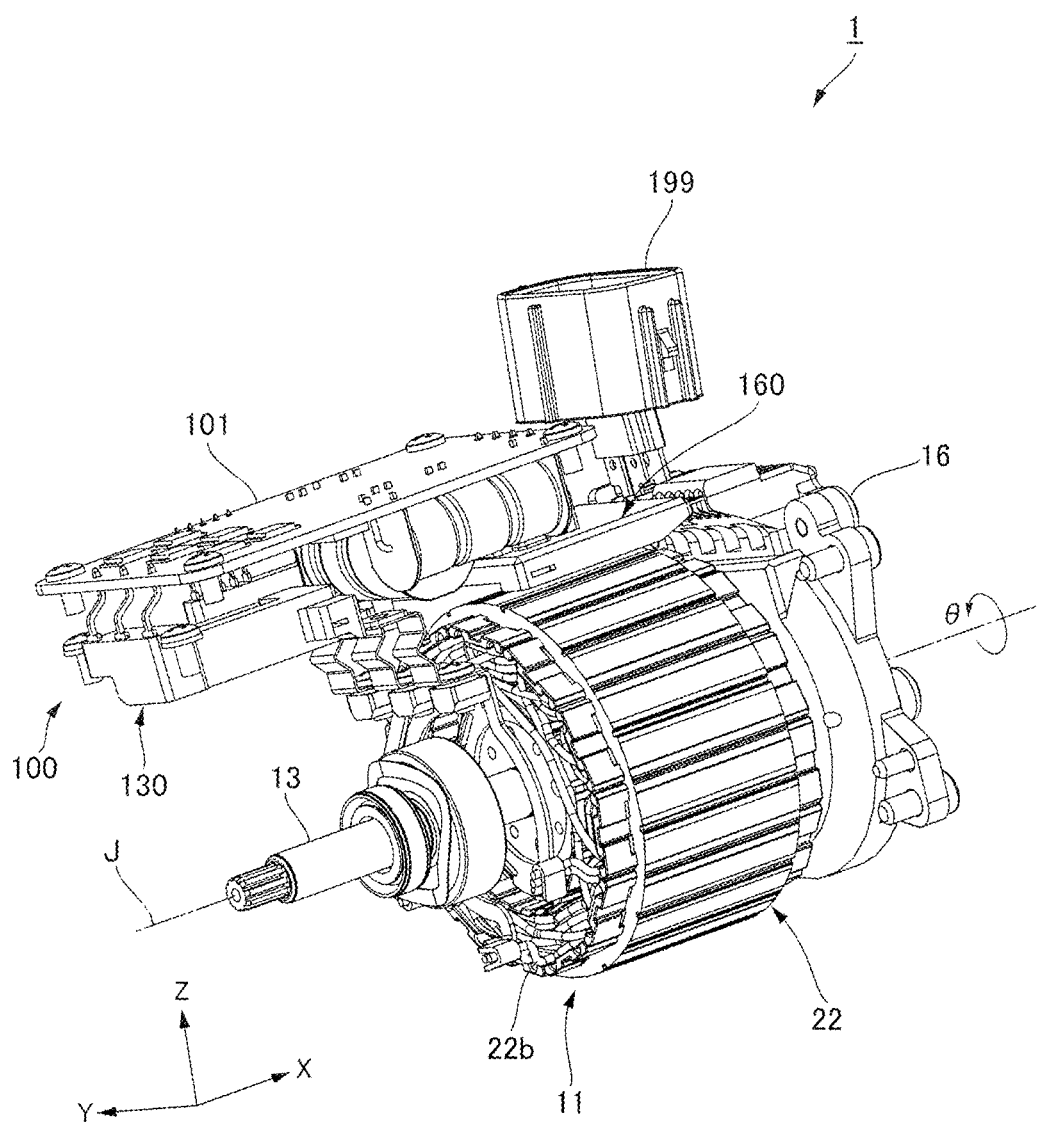
FIG. 5 is an exploded perspective view illustrating a part excluding the housing, the motor cover, the pump cover, and the inverter cover in the same electric oil pump from the front side in the axial direction.
Figure 6:
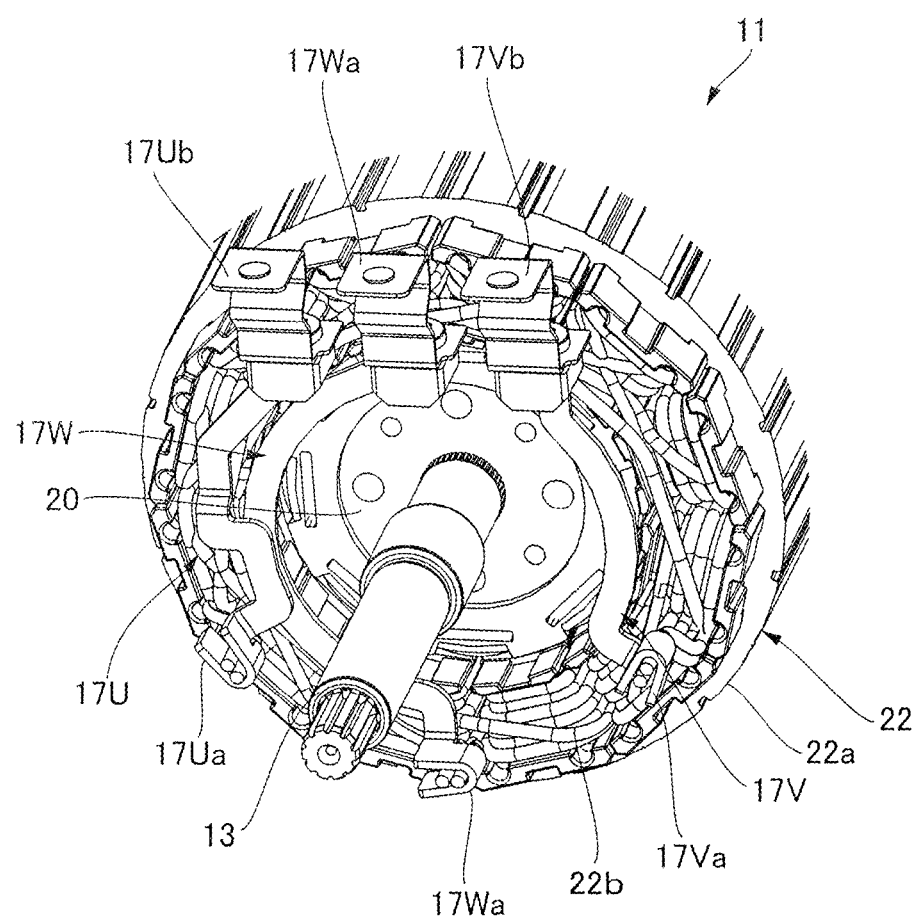
FIG. 6 is a partial perspective view illustrating the front side of a motor of the same electric oil pump.

FIG. 5 is an exploded perspective view illustrating a part excluding the housing (2), the motor cover (16), the pump cover (52), and the inverter cover (198) in the electric oil pump 1 from the front side in the axial direction. FIG. 6 is a partial perspective view illustrating the front side of the motor 11. As illustrated in FIG. 6, the motor 11 includes a bus bar 17U, a bus bar 17W, and a bus bar 17V which are constituted of a metal such as copper. Regarding the bus bar 17U, the bus bar 17W, and the bus bar 17V, suffixes U, W, and V added to the ends of the reference signs respectively indicate a U-phase member, a W-phase member, and a V-phase member in a three-phase power supply. Hereinafter, U, W, and V indicated in the drawings are merely examples and do not identify positions of the U-phase member, the W-phase member, and the V-phase member.

The bus bars (17U, 17W, and 17V) include caulking portions (17Ua, 17Wa, and 17Va) and terminals (17Ub, 17Wb, and 17Vb), respectively. A plurality of U-phase lead wires in the coil 22b are caulked by the caulking portion 17Ua and are electrically connected to the bus bar 17U. A plurality of W-phase lead wires in the coil 22b are caulked by the caulking portion 17Wa and are electrically connected to the bus bar 17W. A plurality of V-phase lead wires in the coil 22b are caulked by the caulking portion 17Va and are electrically connected to the bus bar 17V.

The terminals (17Ub, 17Wb, and 17Vb) of the bus bars (17U, 17W, and 17V) are disposed on the front side in the axial direction of the main body portion having the stator 22 and the like. Specifically, the terminals (17Ub, 17Wb, and 17Vb) are disposed on the front side of the stator 22 in the axial direction. The terminals (17Ub, 17Wb, and 17Vb) are positioned between the stator 22 and the pump unit 40 in the axial direction.

<Pump Unit 40>

As illustrated in FIG. 4, the pump unit 40 is positioned on the front side of the motor unit 10 in the axial direction, is driven by the motor unit 10 via the shaft 13, and discharges oil. The pump unit 40 includes the pump rotor 47 and the pump cover 52.

(Pump Rotor 47)

The pump rotor 47 is attached to the front side of the shaft 13. The pump rotor 47 includes an inner rotor 47a and an outer rotor 47b. The inner rotor 47a is fixed to the shaft 13. The outer rotor 47b surrounds the outward side of the inner rotor 47a in the radial direction.

The inner rotor 47a has a toric shape. The inner rotor 47a is a gear having teeth on an outer surface in the radial direction. The inner rotor 47a rotates around (θ direction) the shaft together with the shaft 13. The outer rotor 47b has a toric shape surrounding the outward side of the inner rotor 47a in the radial direction. The outer rotor 47b is a gear having teeth on an inner surface in the radial direction. The outer surface of the outer rotor 47b in the radial direction has a circular shape.

The gear on the outer surface of the inner rotor 47a in the radial direction and the gear on the inner surface of the outer rotor 47b in the radial direction mesh with each other. The outer rotor 47b rotates when the inner rotor 47a rotates in accordance with rotation of the shaft 13. That is, the pump rotor 47 rotates due to rotation of the shaft 13. The motor unit 10 and the pump unit 40 include the shaft 13 serving as a rotary shaft constituted of the same member. Accordingly, it is possible to curb increase in size of the electric oil pump 1 in the axial direction.

In addition, when the inner rotor 47a and the outer rotor 47b rotate, the volume between meshing parts of the inner rotor 47a and the outer rotor 47b changes. A region in which the volume decreases becomes a positive pressure region, and a region in which the volume increases becomes a negative pressure region.

(Pump Cover 52)

The housing 2 includes an opening directed to the front side in the axial direction at an end on the front side in the axial direction. This opening is closed by the pump cover 52. The pump cover 52 is fixed to the housing 2 using a bolt 53.

<Inverter 100>

Figure 7:
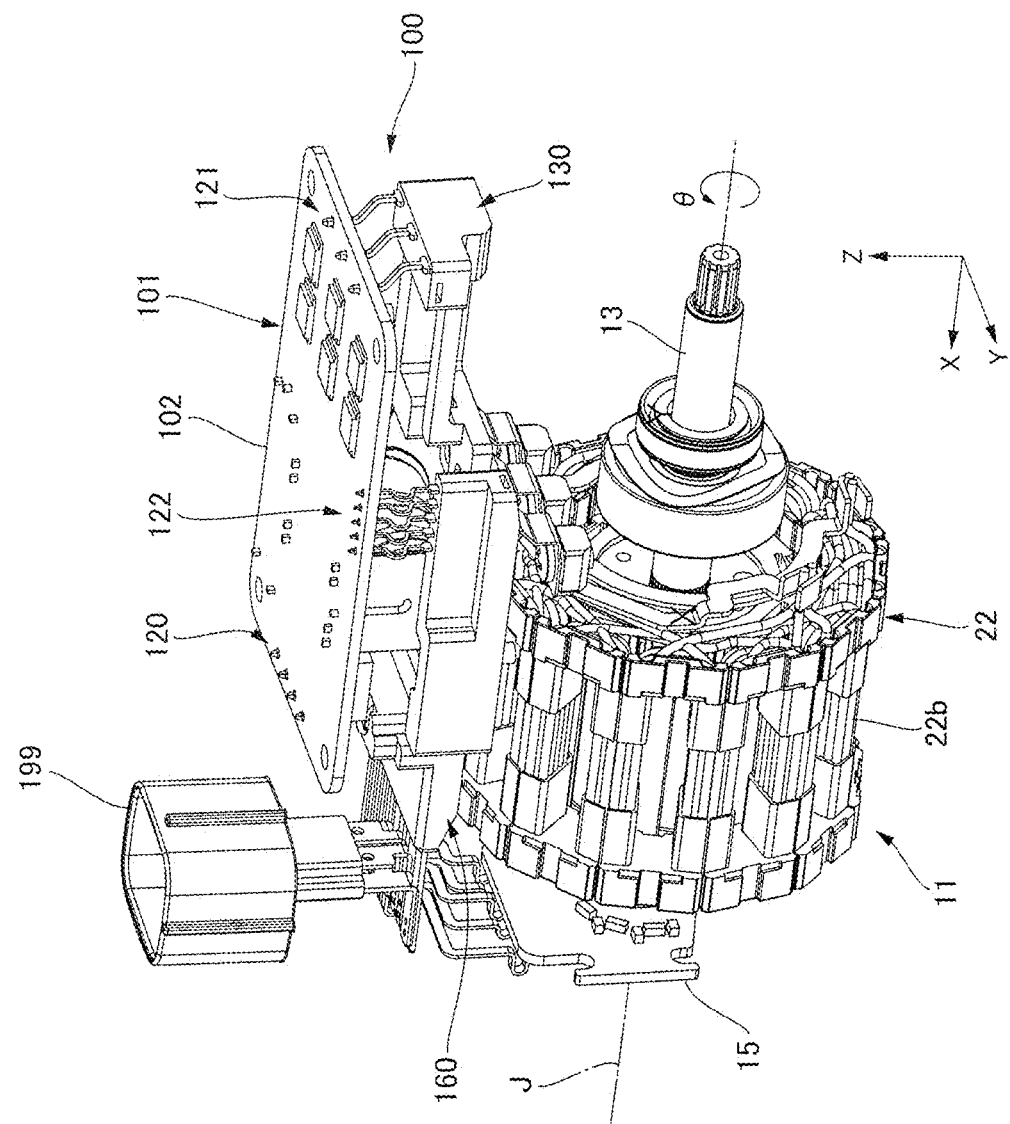
FIG. 7 is a perspective view illustrating the same motor, a part of an inverter inside the housing, and a rotation angle sensor from the front side in the axial direction.

As illustrated in FIG. 4, the inverter 100 is disposed on the positive Z side of the motor unit 10 and the pump unit 40 in the Z axis direction. FIG. 7 is a perspective view illustrating the motor 11, a part of the inverter 100 inside the housing (2 in FIG. 2), and the rotation angle sensor 15 from the front side in the axial direction. In the same diagram, for the sake of convenience, illustration of a cylindrical shaped core back (22a in FIG. 6) of the stator 22 in the motor 11 is omitted. The inverter 100 controlling driving of the motor unit 10 includes a control board 101, a first wiring unit 130, a second wiring unit 160, and a connector 199.

(Control Board 101)

The control board 101 includes a board 102 and a plurality of electronic components mounted on the board 102. A part of the plurality of electronic components constitutes a motor drive circuit having a function of an inverter. The board 102 includes a sensor connection portion 122 electrically connected to each of the wirings extending from the rotation angle sensor 15, a power supply input portion 120, and a motor power supply output portion 121.

As illustrated in FIG. 4, the control board 101 is disposed on the outward side of the motor unit 10 in the radial direction in a posture in which any one surface of both surfaces of the control board 101 lies in the axial direction. Since a first surface and a second surface of the control board 101 are parallel to each other, the control board 101 in the diagram is disposed in a posture in which both surfaces lie in the axial direction. The rotation angle sensor 15 is disposed on the rear side (positive X side) of the control board 101 in the axial direction.

Figure 8:
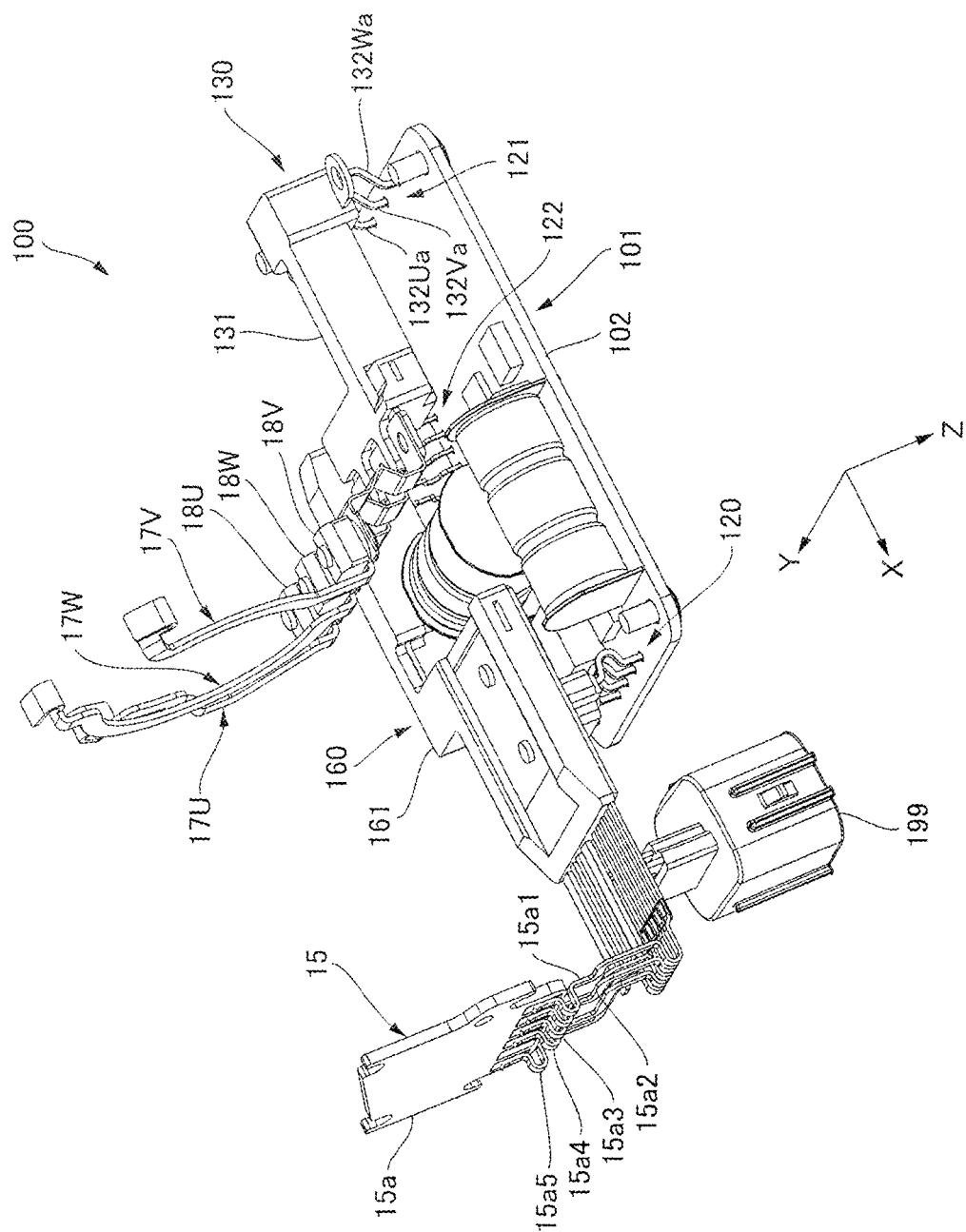
FIG. 8 is a perspective view illustrating a U-phase bus bar, a W-phase bus bar, a V-phase bus bar, a control board, a first wiring unit, a second wiring unit, and a connector in the same electric oil pump from a negative Y side in a Y axis direction.

FIG. 8 is a perspective view illustrating the U-phase bus bar 17U, the bus bar 17W for a W-phase, the bus bar 17V for a V-phase, the control board 101, the first wiring unit 130, the second wiring unit 160, and the connector 199 from a negative Y side in the Y axis direction. The power supply input portion 120 on the board 102 is provided in an end portion of the board 102 on the rear side in the axial direction and is electrically connected to each of the wirings of an ignition power supply of the vehicle. The motor power supply output portion 121 is provided in an end portion of the board 102 on the front side in the axial direction and is electrically connected to each of the bus bars (17U, 17W, and 17V) of the motor 11. The control board 101 converts a DC power supply sent from the ignition power supply of the vehicle into a three-phase AC power supply having a frequency in accordance with a control signal sent from an ECU of the vehicle and outputs the converted three-phase AC power supply from the motor power supply output portion 121 on the board 102. The sensor connection portion (in FIG. 7) 122 is an end portion of the board 102 on a positive Y side in the Y axis direction and is provided in a central portion in the axial direction.

(First Wiring Unit 130)

The first wiring unit 130 plays a role of electrically connecting each of the bus bars (17U, 17W, and 17V) of the motor 11 and the motor power supply output portion 121 on the board 102 to each other. The second wiring unit 160 plays a role of electrically connecting each of the terminals of the connector 199 and the power supply input portion 120 on the board 102 to each other and plays a role of electrically connecting the rotation angle sensor 15 of the motor 11 and the sensor connection portion (122 in FIG. 7) on the board 102. The first wiring unit 130 includes a wiring holder 131.

Figure 9:
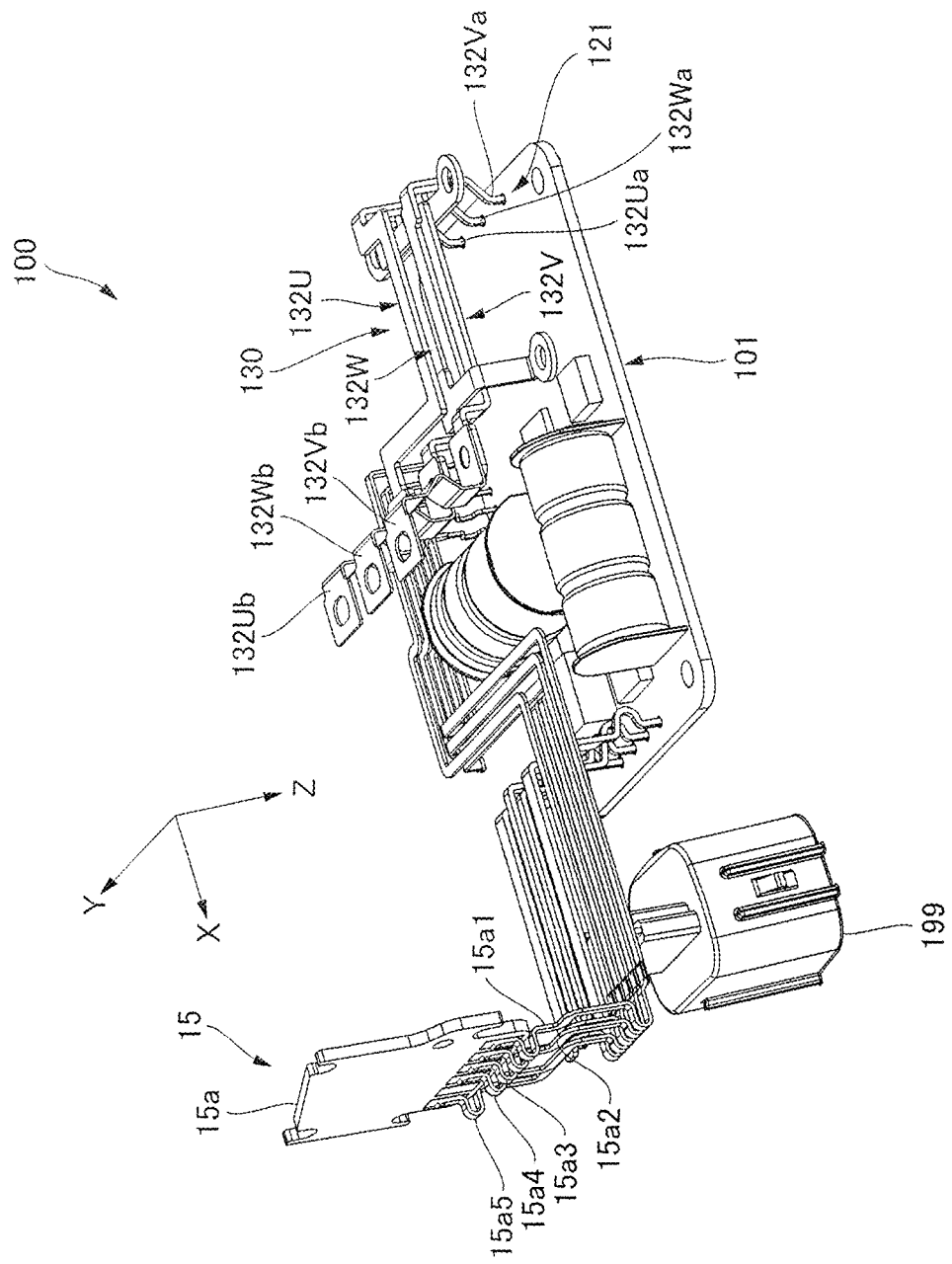
FIG. 9 is a perspective view in which illustration of a wiring holder of the first wiring unit in FIG. 8 is omitted, illustration of a wiring holder of the second wiring unit in FIG. 8 is omitted, and illustration of the bus bars in FIG. 8 is omitted.
Figure 10:
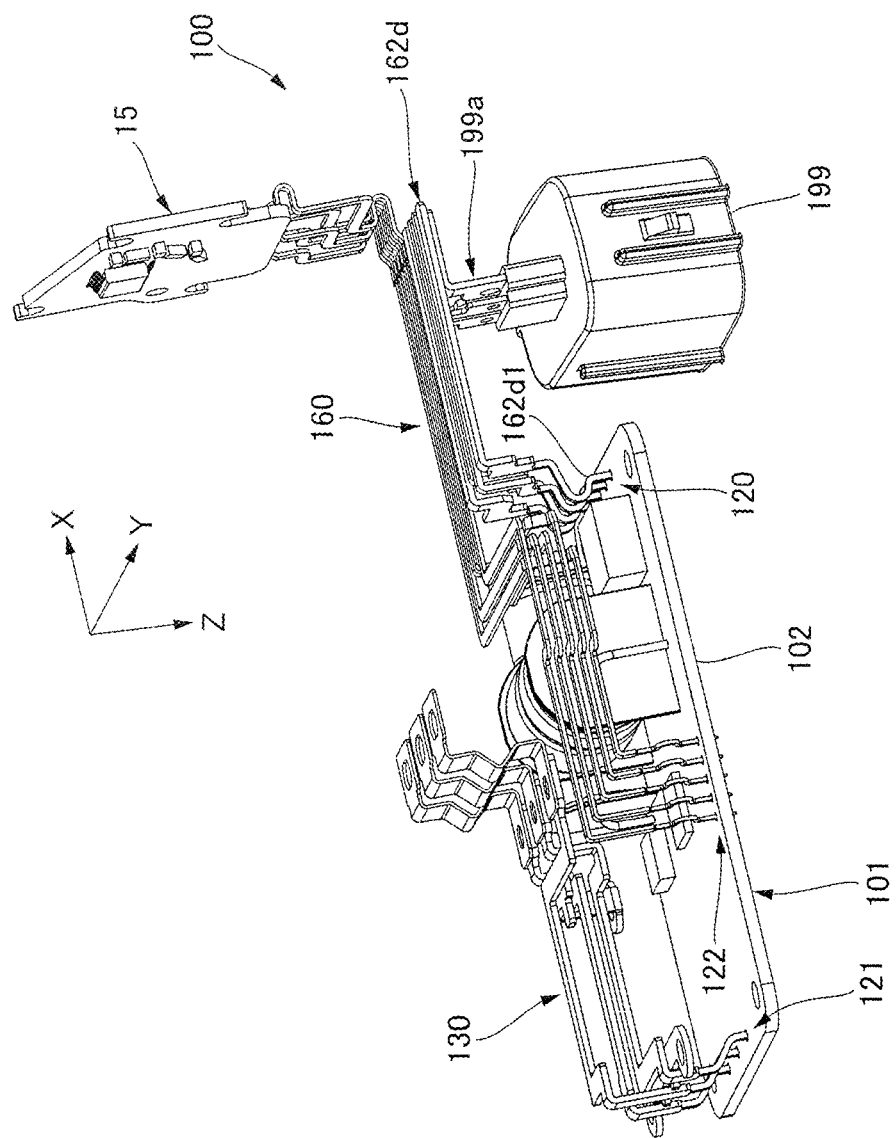
FIG. 10 is a perspective view illustrating the control board, the first wiring unit, the second wiring unit, and the connector in the same state as that in FIG. 9 from a side opposite to that in FIG. 9.

FIG. 9 is a perspective view in which illustration of the wiring holder 131 of the first wiring unit 130 in FIG. 8 is omitted, illustration of a wiring holder 161 of the second wiring unit 160 in FIG. 8 is omitted, and illustration of the bus bars (17U, 17W, and 17V) in FIG. 8 is omitted. FIG. 10 is a perspective view illustrating the control board 101, the first wiring unit 130, the second wiring unit 160, and the connector 199 in the same state as that in FIG. 9 from a side opposite to that in FIG. 9.

As illustrated in FIG. 9, the first wiring unit 130 includes a U-phase power supply output wiring 132U, a W-phase power supply output wiring 132W, and a V-phase power supply output wiring 132V. All of the U-phase power supply output wiring 132U, the W-phase power supply output wiring 132W, and the V-phase power supply output wiring 132V extend in the axial direction and are arranged in the Y axis direction at predetermined intervals.

The U-phase power supply output wiring 132U includes an insertion portion 132Ua provided in an end portion on the front side in the axial direction, and a terminal portion 132Ub provided in an end portion on the rear side in the axial direction. A central portion of the U-phase power supply output wiring 132U in the axial direction extends in the axial direction. The end portion of the U-phase power supply output wiring 132U on the front side in the axial direction is bent toward the positive Z side in the Z axis direction, and a bent tip part constitutes the insertion portion 132Ua. The end portion of the U-phase power supply output wiring 132U on the rear side in the axial direction is bent toward the positive Z side in the Z axis direction, and a bent tip part constitutes the terminal portion 132Ub. Similar to the U-phase power supply output wiring 132U, the W-phase power supply output wiring 132W and the V-phase power supply output wiring 132V also include insertion portions (132Wa and 132Va) and terminal portions (132Wb and 132Vb).

The insertion portion 132Ua of the U-phase power supply output wiring 132U is soldered to a through hole and a land surrounding the through hole in a state of being inserted into a U-phase through hole in the motor power supply output portion 121 on the board 102. Both the inner circumferential surface of the through hole and the land described above are constituted of a conductive material such as copper. Similar to the insertion portion 132Ua of the U-phase power supply output wiring 132U, the insertion portion 132Wa of the W-phase power supply output wiring 132W and the insertion portion 132Va of the V-phase power supply output wiring 132V are also soldered in a state of being inserted into a W-phase through hole and a V-phase through hole of the motor power supply output portion 121 on the board 102.

The terminal portion 132Ub of the U-phase power supply output wiring 132U is fixed to a U-phase terminal base (18U in FIG. 8) fixed to the terminal of the U-phase bus bar 17U using a screw or the like in a state of overlapping the terminal (17Ub in FIG. 6) of the U-phase bus bar 17U in the Z axis direction. Similar to the terminal of the U-phase power supply output wiring 132U, the terminal portion 132Wb of the W-phase power supply output wiring 132W and the terminal portion 132Vb of the V-phase power supply output wiring 132V are also fixed to terminal bases (18W and 18V in FIG. 8). A method of fixing the terminal portions (132Ub, 132Wb, and 132Vb) of the power supply output wirings for respective phases to the terminal bases (18U, 18W, and 18V in FIG. 8) for respective phases is not limited to screwing. For example, the terminal portions of the power supply output wirings and the terminals of the bus bars may be fixed to the terminal bases by applying heat energy, or the terminal portions and the terminals may be connected to each other utilizing metal characteristics without using a fixing tool.

The U-phase power supply output wiring 132U electrically connects the terminal (17Ub in FIG. 6) of the U-phase bus bar 17U and the motor power supply output portion 121 on the board 102 to each other as the insertion portion 132Ua is soldered and the U-phase power supply output wiring 132U is fixed to the terminal base (18U in FIG. 8) of the terminal portion 132Ub. The W-phase power supply output wiring 132W electrically connects the terminal (17Wb in FIG. 6) of the bus bar 17W for a W-phase and the motor power supply output portion 121 on the board 102 to each other as the insertion portion 132Wa is soldered and the W-phase power supply output wiring 132W is fixed to the terminal base (18W in FIG. 8) of the terminal portion 132Wb. The V-phase power supply output wiring 132V electrically connects the terminal (17Vb in FIG. 6) of the bus bar 17V for a V-phase and the motor power supply output portion 121 on the board 102 to each other as the insertion portion 132Va is soldered and the V-phase power supply output wiring 132V is fixed to the terminal base (18V in FIG. 8) of the terminal portion 132Vb.

All of the U-phase power supply output wiring 132U, the W-phase power supply output wiring 132W, and the V-phase power supply output wiring 132V are constituted of metal plates such as copper plates. Hereinafter, the U-phase power supply output wiring 132U, the W-phase power supply output wiring 132W, and the V-phase power supply output wiring 132V will be collectively referred to as the power supply output wirings 132 for respective phases.

The wiring holder (131 in FIG. 8) of the first wiring unit 130 is constituted of a resin or the like and holds a central portion of each of the U-phase power supply output wiring 132U, the W-phase power supply output wiring 132W, and the V-phase power supply output wiring 132V in the axial direction in a state of being molded into a predetermined shape.

As illustrated in FIG. 4, the first wiring unit 130 is disposed between the first surface of the board 102 and the pump unit 40.

(Connector 199)

The connector 199 is connected to an external ignition power supply connector. The ignition power supply connector includes four ports, such as a permanent power supply port, a GND port, a CAN-Lo signal port, and a CAN-Hi signal port. The ignition power supply connector is moved by an operator from the positive Z side toward the negative Z side in the Z axis direction and is mounted in the connector 199. As illustrated in FIG. 10, the connector 199 includes a terminal portion 199a having four connector terminals electrically connected to the four respective ports of the ignition power supply. The respective four connector terminals are disposed side by side in the Y axis direction in a posture of extending in the axial direction.

In the Y axis direction, a permanent power supply connector terminal is positioned farthest to the positive Y side among the four connector terminals. In addition, in the Y axis direction, a GND connector terminal is positioned farthest to the negative Y side among the four connector terminals. In the Y axis direction, a CAN-Lo signal connector terminal and a CAN-Hi signal connector terminal are positioned between the permanent power supply connector terminal and the GND connector terminal.

(Second Wiring Unit 160)

Figure 11:
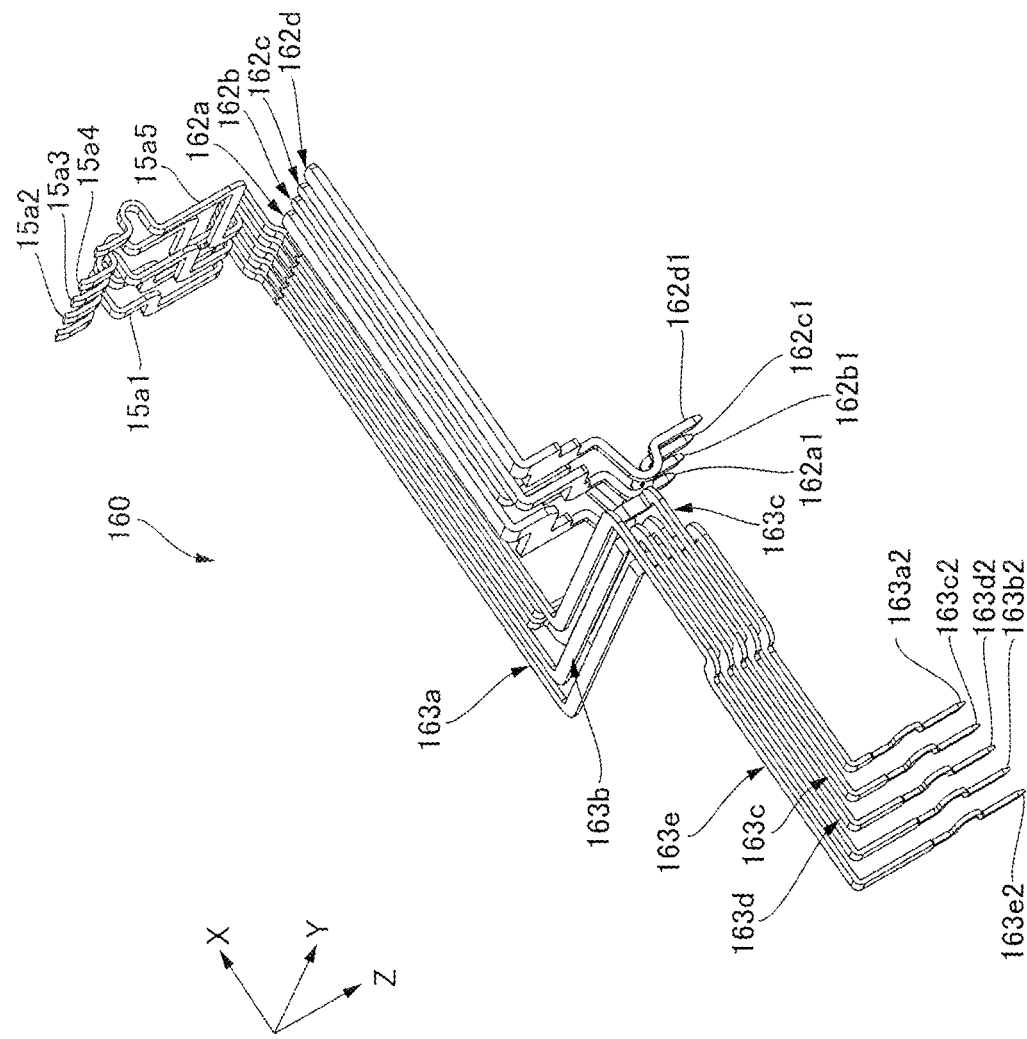
FIG. 11 is a perspective view illustrating power supply input wirings and sensor wirings in the second wiring unit.

As illustrated in FIG. 8, the second wiring unit 160 includes the wiring holder 161. FIG. 11 is a perspective view illustrating power supply input wirings and sensor wiring in the second wiring unit 160. Four power supply input wirings of the second wiring unit 160 are present including a first power supply input wiring 162a, a second power supply input wiring 162b, a third power supply input wiring 162c, and a fourth power supply input wiring 162d in detail. Five sensor wirings of the second wiring unit 160 are present including a first sensor wiring 163a, a second sensor wiring 163b, a third sensor wiring 163c, a fourth sensor wiring 163d, and a fifth sensor wiring 163e in detail. Hereinafter, the first to fourth power supply input wirings will be collectively referred to as four power supply input wirings 162. In addition, the first to fifth sensor wirings will be collectively referred to as five sensor wirings 163.

All the four power supply input wirings 162 and the five sensor wirings 163 are constituted of metal plates such as copper plates. On the rear side on the inverter 100 in the axial direction, the four power supply input wirings 162 and the five sensor wirings 163 are disposed side by side in the Y axis direction in a posture of extending in the axial direction. The four power supply input wirings 162 are arranged in the order of the first wiring (162a), the second wiring (162b), the third wiring (162c), and the fourth wiring (162d) from the negative Y side toward the positive Y side in the Y axis direction at positions on the rear side of the inverter 100 in the axial direction. The five sensor wirings 163 are arranged in the order of the first wiring (163a), the second wiring (163b), the third wiring (163c), the fourth wiring (163d), and the fifth wiring (163e) from the negative Y side toward the positive Y side in the Y axis direction at positions on the rear side of the inverter 100 in the axial direction. Regarding the positions on the rear side of the inverter 100 in the axial direction, the four power supply input wirings 162 are positioned on the positive Y side of the five sensor wirings 163 in the Y axis direction.

An order of arrangement of the four power supply input wirings 162 in the Y direction is not limited to the order described above, and any order may be adopted. In addition, an order of arrangement of the five sensor wirings 163 in the Y axis direction is also not limited to the order described above, and any order may be adopted.

The permanent power supply connector terminal in the terminal portion 199a of the connector 199 illustrated in FIG. 10 is soldered or welded to the first power supply input wiring 162a for the permanent power supply of the four power supply input wirings 162 illustrated in FIG. 11. The GND connector terminal in the terminal portion 199a of the connector 199 illustrated in FIG. 10 is soldered or welded to the fourth power supply input wiring 162d for the GND of the four power supply input wirings 162 illustrated in FIG. 11. The CAN-Lo signal connector terminal in the terminal portion 199a of the connector 199 illustrated in FIG. 10 is soldered or welded to the second power supply input wiring 162b for the CAN-Lo signal of the four power supply input wirings 162 illustrated in FIG. 11. The CAN-Hi signal connector terminal in the terminal portion 199a of the connector 199 illustrated in FIG. 10 is soldered or welded to the third power supply input wiring 162c for the CAN-Hi signal of the four power supply input wirings 162 illustrated in FIG. 11.

As illustrated in FIG. 11, each of the four power supply input wirings 162 includes the insertion portions (162a1, 162b1, 162c1, and 162d1) having similar structures. The end portion of each of the four power supply input wirings 162 on the front side in the axial direction is bent toward the positive Z side in the Z axis direction, and bent tips constitute the insertion portions 162a1, 162b1, 162c1, and 162d1.

In FIG. 10, the power supply input portion 120 on the board 102 includes four sets of a through hole and a land surrounding the through hole. The four sets described above are connection portions independently electrically connected to the respective connector terminals different from each other and are arranged in the Y axis direction.

The insertion portion (162a1 in FIG. 11) of the first power supply input wiring 162a for the permanent power supply is soldered to a through hole and a land surrounding the through hole in a state of being inserted into a permanent power supply through hole in the power supply input portion 120 on the board 102. Both the inner circumferential surface of the through hole and the land described above are constituted of a conductive material such as copper. The insertion portion (162d1 in FIG. 11) of the fourth power supply input wiring 162d for the GND is soldered to a GND through hole and a land in the power supply input portion 120 on the board 102. The insertion portion (162b1 in FIG. 11) of the second power supply input wiring 162b for the CAN-Lo signal is soldered to a CAN-Lo signal through hole and a land in the power supply input portion 120 on the board 102. The insertion portion (162c1 in FIG. 11) of the third power supply input wiring 162c for the CAN-Hi signal is soldered to a CAN-Hi signal through hole and a land in the power supply input portion 120 on the board 102.

As described above, the connector terminals different from each other are soldered or welded to respective parts of the four power supply input wirings 162 on the rear side in the axial direction. In addition, the insertion portions (162a1, 162b1, 162c1, and 162d1 in FIG. 11) in the four power supply input wirings 162 are soldered to the respective sets of a through hole and a land different from each other in the power supply input portion 120 on the board 102. According to such a constitution, the four power supply input wirings 162 electrically connect the connector terminals of the connector 199 and the power supply input portion on the control board 101 to each other.

A length of each of the five sensor wirings 163 in the axial direction is longer than lengths of the four power supply input wirings 162 in the axial direction.

As illustrated in FIGS. 9 and 11, the sensor substrate 15a includes a sensor terminal 15a1 outputting the first signal H1, a sensor terminal 15a2 connected to the GND, and a sensor terminal 15a3 outputting the second signal H2. In addition, the sensor substrate 15a includes a sensor terminal 15a4 outputting the third signal H3, and a sensor terminal 15a5 connected to a 5 V power supply. That is, the sensor substrate 15a includes five sensor terminals.

Each of the five sensor terminals protrudes from the substrate surface of the sensor substrate 15a to the positive Z side in the Z axis direction, and then it is bent at an angle of approximately 90[°] toward the front side in the axial direction. Further, a bent tip is connected to the sensor wiring (163) of the second wiring unit 160. The connection described above is performed through welding or soldering. In the axial direction, end portions of the five sensor wirings 163 on the rear side are at the same positions as end portions of the four power supply input wirings 162 on the rear side. Each of the five sensor terminals is connected to the end portions of the sensor wirings 163 on the rear side in the axial direction. Each of the five sensor terminals is constituted of a conductive material such as copper.

Insertion portions (163a2, 163b2, 163c2, 163d2, and 163e2) are respectively provided in end portions of the five sensor wirings 163 on the front side in the axial direction. The end portion of each of the five sensor wirings 163 on the front side in the axial direction is bent toward the positive Z side in the Z direction, and bent tips constitute the insertion portions (163a2, 163b2, 163c2, 163d2, and 163e2).

The first sensor wiring 163a of the five sensor wirings 163 is a wiring for the first signal H1. In addition, the second sensor wiring 163b is a wiring for the GND. In addition, the third sensor wiring 163c is a wiring for the second signal H2. In addition, the fourth sensor wiring 163d is a wiring for the third signal H3. In addition, the fifth sensor wiring 163e is a wiring for the 5 V power supply.

An order of arrangement of the five sensor wirings 163 in the Y axis direction is not limited to the order described above, and any order may be adopted.

In the five sensor wirings 163, a part excluding the insertion portions (163a2, 163b2, 163c2, 163d2, and 163e2) extends in the axial direction.

Each of the five sensor wirings 163 has a shape in which a part on the front side of the four power supply input wirings 162 in the axial direction is bent in a complicated manner. Hereinafter, a position at which the sensor wirings 163 is bent first from the rear side toward the front side in the axial direction will be referred to as "a bending origin".

The rear side of the fifth sensor wiring 163e for the 5 V power supply in the axial direction is positioned at the fifth place counting from the negative Y side in the Y axis direction among the five sensor wirings 163. The fifth sensor wiring 163e for the 5 V power supply is bent toward the positive Y side in the Y axis direction at "the bending origin", and then it is bent toward the front side in the axial direction. Moreover, immediately after being bent to the negative Y side in the Y axis direction, the fifth sensor wiring 163e for the 5 V power supply is bent to the front side in the axial direction. Hereinafter, in the five sensor wirings 163, a state of being bent to the front side in the axial direction immediately after being bent to the negative Y side in the Y axis direction as described above will be referred to as a state of being bent in a crank shape. Since the fifth sensor wiring 163e is bent in a complicated manner as described above, the insertion portion 163e2 (which will be described below) faces the sensor connection portion (122 in FIG. 10) on the board 102 in the Z axis direction.

The rear side of the second sensor wiring 163b for the GND in the axial direction is positioned at the second place counting from the negative Y side in the Y axis direction among the five sensor wirings 163. "The bending origin" of the second sensor wiring 163b for the GND is positioned on the front side of "the bending origin" of the fifth sensor wiring 163e in the axial direction. The second sensor wiring 163b is bent toward the positive Y side in the Y axis direction at "the bending origin", and then it is slightly bent toward the positive Z side in the Z axis direction. Thereafter, the second sensor wiring 163b is bent toward the positive Y side in the Y axis direction and arrives at a position facing the fifth sensor wiring 163e in the Z axis direction. At this position, the second sensor wiring 163b is bent toward the front side in the axial direction, and then it is bent in a crank shape similar to the fifth sensor wiring 163e while facing the fifth sensor wiring 163e in the Z axis direction. Since the second sensor wiring 163b is bent in a complicated manner as described above, the insertion portion 163b2 (which will be described below) faces the sensor connection portion (122 in FIG. 10) on the board 102 at a position on the positive Z side from the fifth sensor wiring 163e in the Z axis direction.

The rear side of the third sensor wiring 163c for the second signal H2 in the axial direction is positioned at the third place counting from the negative Y side in the Y axis direction among the five sensor wirings 163. "The bending origin" of the third sensor wiring 163c for the second signal H2 is positioned on the rear side of "the bending origin" of the fifth sensor wiring 163e in the axial direction. The third sensor wiring 163c is slightly bent toward the positive Z side in the Z axis direction at "the bending origin", and then it is slightly bent toward the front side in the axial direction. Thereafter, the third sensor wiring 163c is bent toward the positive Y side in the Y axis direction and faces the fifth sensor wiring 163e for the 5 V power supply in the Z axis direction. Moreover, the third sensor wiring 163c is bent toward the positive Z side in the Z axis direction, and then it is bent to the positive Y side in the Y axis direction. Thereafter, the third sensor wiring 163c is bent toward the front side in the axial direction, and then it is bent in a crank shape similar to the fifth sensor wiring 163e. Since the third sensor wiring 163c is bent in a complicated manner as described above, the insertion portion 163c2 (which will be described below) faces the sensor connection portion (122 in FIG. 10) on the board 102 in the Z axis direction.

The rear side of the fourth sensor wiring 163d for the third signal H3 in the axial direction is positioned at the fourth place counting from the negative Y side in the Y axis direction among the five sensor wirings 163. "The bending origin" of the fourth sensor wiring 163d and "the bending origin" of the third sensor wiring 163c are at the same positions in the axial direction. The fourth sensor wiring 163d is bent to the positive Z side in the Z axis direction at "the bending origin", and then it is bent to the front side in the axial direction and three-dimensionally intersects the third sensor wiring 163c on the positive Z side. Thereafter, the fourth sensor wiring 163d is bent to the positive Y side in the Y axis direction at a position facing the second sensor wiring 163b in the Z axis direction. Further, the fourth sensor wiring 163d is bent to the front side in the axial direction at a position facing both (enter between both) the second sensor wiring 163b and the third sensor wiring 163c in the Z axis direction. Moreover, the fourth sensor wiring 163d is bent in a crank shape similar to the fifth sensor wiring 163e. Since the fourth sensor wiring 163d is bent in a complicated manner as described above, the insertion portion 163d2 (which will be described below) faces the sensor connection portion (122 in FIG. 10) on the board 102 in the Z axis direction.

The rear side of the first sensor wiring 163a for the first signal H1 in the axial direction is positioned at the first place counting from the negative Y side in the Y axis direction among the five sensor wirings 163. "The bending origin" of the first sensor wiring 163a is on the front side of "the bending origin" of the second sensor wiring 163b in the axial direction. The first sensor wiring 163a is bent to the positive Y side in the Y axis direction at "the bending origin", and then it is bent to the positive Z side in the Z axis direction. Thereafter, the first sensor wiring 163a is bent to the positive Y side in the Y axis direction, and then it is bent to the front side in the axial direction at a position facing the third sensor wiring 163c in the Z axis direction. Moreover, the first sensor wiring 163a is bent in a crank shape similar to the fifth sensor wiring 163e. Since the first sensor wiring 163a is bent in a complicated manner as described above, the insertion portion 163a2 (which will be described below) faces the sensor connection portion (122 in FIG. 10) on the board 102 in the Z axis direction.

In each of the five sensor wirings 163, the parts bent in a crank shape as described above are at the same positions in the axial direction and overlap each other in the Z axis direction.

In the vicinity of the sensor connection portion (122 in FIG. 10) on the board 102, parts of the five sensor wirings 163 extending in the axial direction are arranged in the Z axis direction along a thickness direction of the board 102. Regarding the arrangement order of the foregoing parts in the Z axis direction, they are arranged in the order of the fifth sensor wiring 163e, the second sensor wiring 163b, the fourth sensor wiring 163d, the third sensor wiring 163c, and the first sensor wiring 163a from the negative Z side toward the positive Z side.

In FIG. 10, the sensor connection portion 122 on the board 102 includes five sets of a through hole and a land surrounding the through hole. The five sets described above are arranged in the order of a set for the 5 V power supply, a set for the GND, a set for the third signal H3, a set for the second signal H2, a set for the first signal H1 from the front side toward the rear side in the axial direction. Hereinafter, regarding the through holes, and the sets of a through hole and a land, the arrangement order from the front side toward the rear side in the axial direction will be simply referred to as an arrangement order.

As illustrated in FIG. 11, the end portion of the fifth sensor wiring 163e for the 5 V power supply on the front side in the axial direction is bent toward the positive Z side in the Z axis direction at a position on the front side from the second sensor wiring 163b for the GND. The insertion portion 163e2 (bent tip part) is inserted into the 5 V power supply through hole positioned at the first place in the arrangement order of the five through holes in the sensor connection portion (122 in FIG. 10) on the board 102 without interfering with any of the four other sensor wirings. Further, the insertion portion 163e2 is soldered to the set of the 5 V power supply through hole and the land.

The end portion of the second sensor wiring 163b for the GND on the front side in the axial direction is bent toward the positive Z side in the Z axis direction at a position on the rear side of the fifth sensor wiring 163e in the axial direction and on the front side of the fourth sensor wiring 163d in the axial direction. The insertion portion 163b2 (bent tip part) is inserted into the GND through hole positioned at the second place in the arrangement order of the five through holes provided in the sensor connection portion (122 in FIG. 10) on the board 102 without interfering with any of the four other sensor wirings. Further, the insertion portion 163b2 is soldered to the set of the GND through hole and the land.

The end portion of the fourth sensor wiring 163d for the third signal H3 on the front side in the axial direction is bent toward the positive Z side in the Z axis direction. The bending position thereof in the axial direction is a position on the rear side from the second sensor wiring 163b and on the front side from the third sensor wiring 163c. The insertion portion 163d2 (bent tip part) is inserted into the third signal H3 through hole positioned at the third place in the arrangement order of the five through holes provided in the sensor connection portion (122 in FIG. 10) on the board 102 without interfering with any of the four other sensor wirings. Further, the insertion portion 163d2 is soldered to the set of the third signal H3 through hole and the land.

The end portion of the third sensor wiring 163c for the second signal H2 on the front side in the axial direction is bent toward the positive Z side in the Z axis direction. The bending position thereof in the axial direction is a position on the rear side from the fourth sensor wiring 163d and on the front side from the first sensor wiring 163a. The insertion portion 163c2 (bent tip part) is inserted into the second signal H2 through hole positioned at the fourth place in the arrangement order of the five through holes in the sensor connection portion (122 in FIG. 10) on the board 102 without interfering with any of the four other sensor wirings.

Further, the insertion portion 163c2 is soldered to the set of the second signal H2 through hole and the land.

The end portion of the first sensor wiring 163a for the first signal H1 on the front side in the axial direction is bent toward the positive Z side in the Z axis direction. The bending position thereof in the axial direction is a position on the rear side from the third sensor wiring 163c. The insertion portion 163a2 (bent tip part) is inserted into the first signal H1 through hole positioned at the fifth place in the arrangement order of the five through holes in the sensor connection portion (122 in FIG. 10) on the board 102 without interfering with any of the four other sensor wirings. Further, the insertion portion 163a2 is soldered to the set of the first signal H1 through hole and the land.

As described above, the rear side of the five sensor wirings 163 of the second wiring unit 160 in the axial direction is connected to the sensor terminals (15a1 to 15a5) of the sensor substrate 15a. In addition, the insertion portions (163a2, 163b2, 163c2, 163d2, and 163e2) of the five sensor wirings 163 are soldered to the respective sets of a through hole and a land different from each other in the sensor connection portion 122 on the board 102. According to such a constitution, the five sensor wirings 163 electrically connect the rotation angle sensor 15 and the sensor connection portion 122 on the board 102 of the control board 101 to each other.

In FIG. 8, the wiring holder 161 of the second wiring unit 160 is constituted of a resin or the like and is molded into a predetermined shape. The rear side of the wiring holder 161 of the second wiring unit 160 in the axial direction holds the four power supply input wirings 162 and the five sensor wirings 163. In each of the four power supply input wirings 162, the connection portions with respect to the connector terminals and the insertion portions (162a1, 162b1, 162c1, and 162d1 in FIG. 11) are not held by the wiring holder 161. In addition, in each of the five sensor wirings 163, the insertion portions (163a2, 163b2, 163c2, 163d2, and 163e2 in FIG. 11) are not held by the wiring holder 161.

Each of the four sets of a through hole and a land in the power supply input portion 120 on the board 102 is disposed on the board 102 in a form of being arranged in the Y axis direction along the radial direction. A plurality of connector terminals of the connector 199 are disposed in a form of being arranged in the same direction as the four sets of a through hole and a land of the power supply input portion 120. Each of the five sensor terminals (15a1 to 15a5) of the sensor substrate 15a is disposed in the sensor substrate 15a in a form of being arranged in the same direction as the four sets of a through hole and a land of the power supply input portion 120.

The wiring holder 161 of the second wiring unit 160 holds each of the four power supply input wirings 162 and each of the five sensor wirings 163 on the rear side in the axial direction in a form of being arranged in the same direction as the arrangement direction of the sets of a through hole and a land of the power supply input portion 120 on the board 102.

As illustrated in FIG. 10, the sensor connection portion 122 on the board 102 is disposed between the power supply input portion 120 and the motor power supply output portion 121 in the axial direction.

Figure 12:
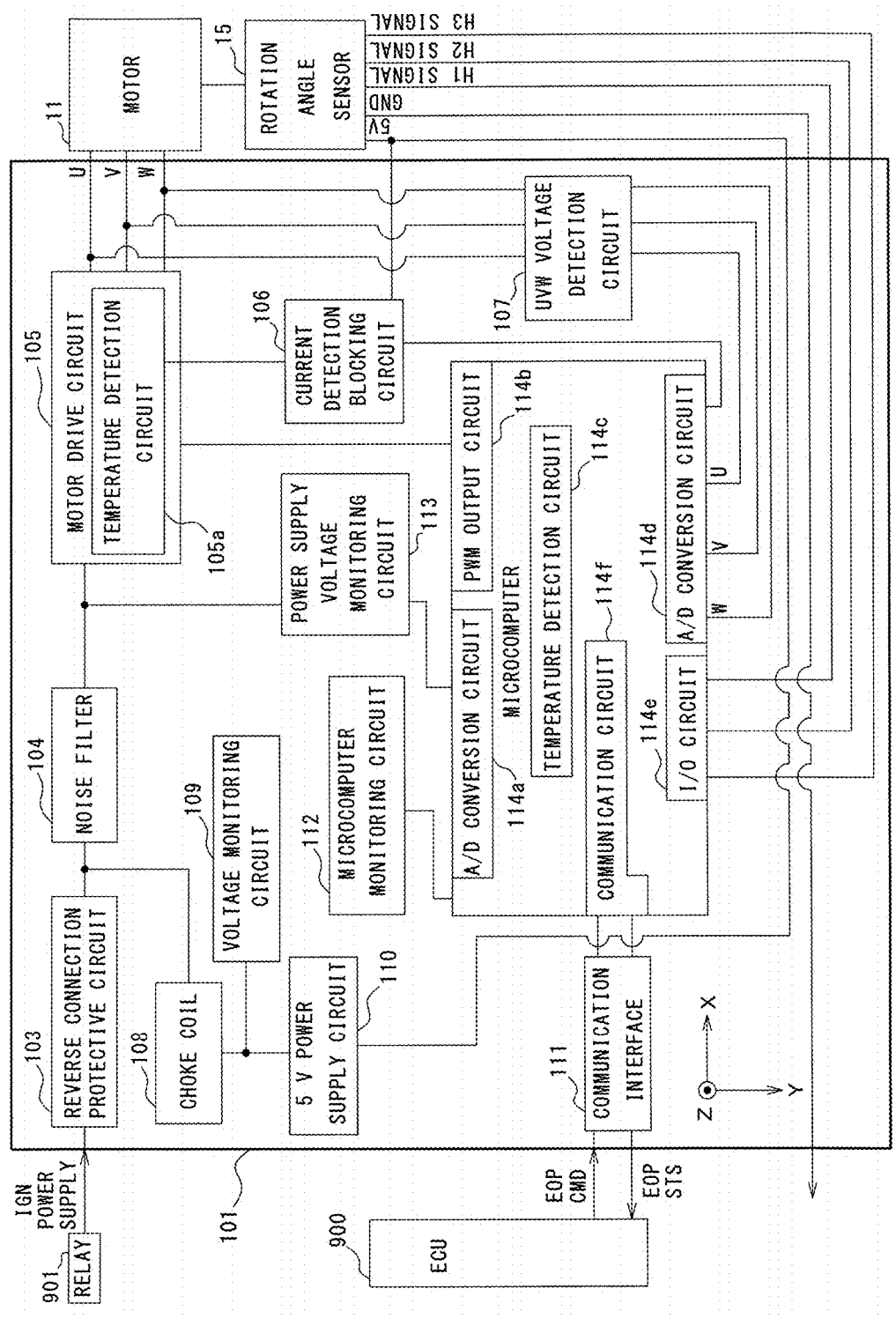
FIG. 12 is a circuit diagram of the control board.

FIG. 12 is a circuit diagram of the control board 101 of the inverter 100. The control board 101 includes a reverse connection protective circuit 103, a noise filter 104, a motor drive circuit 105, a current detection blocking circuit 106, a UVW voltage detection circuit 107, a choke coil 108, and a voltage monitoring circuit 109. In addition, the control board 101 includes a 5 V power supply circuit 110, a communication interface 111, a microcomputer monitoring circuit 112, a power supply voltage monitoring circuit 113, and a microcomputer 114.

The ignition (IGN) power supply is connected to the power supply input portion (120 in FIG. 10) on the board 102 of the control board 101 via a relay 901 of the vehicle. The permanent power supply of the ignition power supply and the GND are connected to the motor drive circuit 105 via the reverse connection protective circuit 103 and the noise filter 104 for eliminating noise.

The reverse connection protective circuit 103 is a circuit for preventing a reverse current from flowing to the downstream side when the permanent power supply of the ignition power supply and the GND are reversely connected to each other.

The power supply voltage monitoring circuit 113 is connected to the wiring electrically connecting the noise filter 104 and the motor drive circuit 105 to each other. The power supply voltage monitoring circuit 113 detects a DC voltage output from the noise filter 104 to the motor drive circuit 105 and outputs a detection value to an A/D conversion circuit 114a of the microcomputer 114.

The microcomputer 114 includes the A/D conversion circuit 114a, a PWM output circuit 114b, a temperature detection circuit 114c, an A/D conversion circuit 114d, an I/O circuit 114e, and a communication circuit 114f. The microcomputer 114 receives a control signal sent from an ECU 900 of the vehicle via the communication interface 111 on the control board 101 in the communication circuit 114f and generates a PWM signal for rotatably driving the motor 11 at a frequency based on the control signal. A generated PWM signal is output from the PWM output circuit 114b of the microcomputer 114 and is input to the motor drive circuit 105.

The motor drive circuit 105 converts a DC power supply sent from the noise filter 104 into the three-phase AC power supply at a frequency in accordance with a PWM signal sent from the PWM output circuit 114b of the microcomputer 114 and outputs the converted three-phase AC power supply to the motor 11. The motor drive circuit 105 includes a plurality of bipolar transistors (MOS-FET) for switching and a temperature detection circuit 105a. The temperature detection circuit 105a of the motor drive circuit 105 outputs a detection value of a temperature to the current detection blocking circuit 106.

The current detection blocking circuit 106 detects a current flowing from the motor drive circuit 105 to the motor 11. When a detected current value exceeds a predetermined upper limit or a detection value of a temperature sent from the temperature detection circuit 105a of the motor drive circuit 105 exceeds a predetermined upper limit, the current detection blocking circuit 106 outputs a block signal to the microcomputer 114.

When a block signal is sent from the current detection blocking circuit 106 or a detection value of a temperature detected by the temperature detection circuit 114c of the microcomputer 114 exceeds a predetermined upper limit, the microcomputer 114 stops generating of a PWM signal and suspends driving of the motor 11.

The UVW voltage detection circuit 107 detects a voltage of the three-phase AC power supply output from the motor drive circuit 105 to the motor 11 and outputs a detection value to the A/D conversion circuit 114d of the microcomputer 114.

The 5 V power supply circuit 110 is connected, via the choke coil 108, to the wiring electrically connecting the reverse connection protective circuit 103 and the noise filter 104 to each other. The choke coil 108 constitutes a circuit for preventing an overcurrent of a current flowing in the 5 V power supply circuit 110. The 5 V power supply circuit 110 outputs the 5 V power supply to the rotation angle sensor 15.

The microcomputer monitoring circuit 112 is connected to the microcomputer 114 and monitors the presence or absence of abnormality in the microcomputer 114 through communication with the microcomputer 114.

The voltage monitoring circuit 109 detects a voltage of a DC power supply sent from the choke coil 108 to the 5 V power supply circuit 110 and outputs a detection value to the A/D conversion circuit 114a of the microcomputer 114.

The first signal H1, the second signal H2, and the third signal H3 output from the rotation angle sensor 15 are input to the I/O circuit 114e of the microcomputer 114. The microcomputer 114 identifies a rotation angle of the rotor (20 in FIG. 3) of the motor 11 based on the first signal H1, the second signal H2, and the third signal H3 and calculates a rotation frequency of the rotor based on the identification results.

Figure 13:
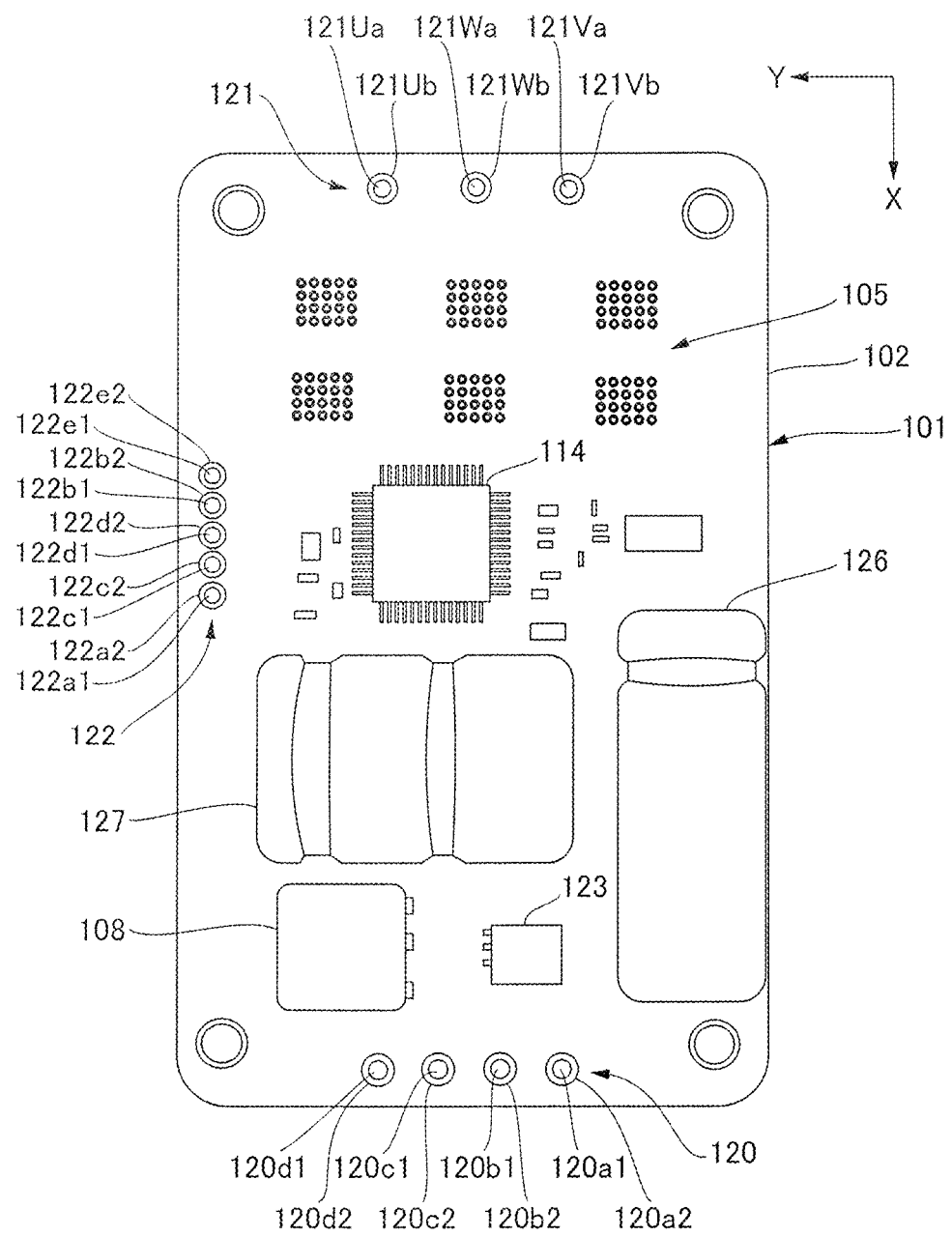
FIG. 13 is a plan view illustrating a first surface of the control board.
Figure 14:
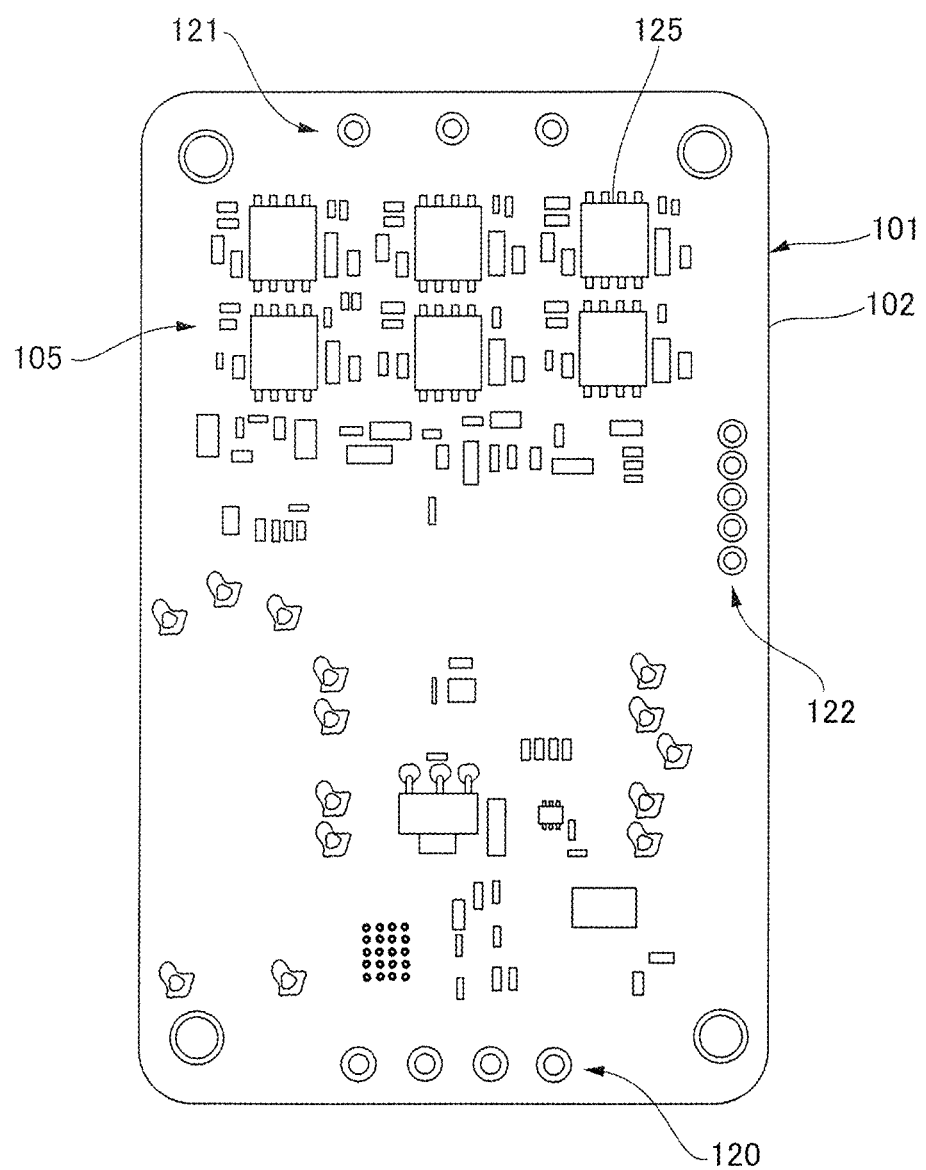
FIG. 14 is a plan view illustrating a second surface of the control board.

FIG. 13 is a plan view illustrating the first surface of the control board 101. FIG. 14 is a plan view illustrating the second surface of the control board 101. The power supply input portion 120 disposed in the end portion of the board 102 of the control board 101 on the rear side (positive X side) in the axial direction includes four sets of a through hole and a land. A first set is a set of a permanent power supply through hole 120a1 and a land 120a2. A second set is a set of a CAN-Lo signal through hole 120b1 and a land 120b2. A third set is a set of a CAN-Hi signal through hole 120c1 and a land 120c2. A fourth set is a set of a GND through hole 120d1 and a land 120d2. All the four sets described above are connection portions electrically connected to the four respective connector terminals of the connector (199 in FIG. 10) and are arranged side by side in the Y axis direction.

The choke coil 108, a bipolar transistor 123 constituting the reverse connection protective circuit (103 in FIG. 12), a first capacitor 126, and a second capacitor 127 are mounted in a region on the rear side (negative X side) of the power supply input portion 120 on the board 102 in the axial direction. The first capacitor 126 and the second capacitor 127 are electronic components constituting the noise filter (104 in FIG. 12). The second capacitor 127 of the plurality of electronic components mounted on the board 102 is an electronic component having the maximum thickness (size of the board 102 in the thickness direction). In addition, the second capacitor 127 is disposed on the front side from the choke coil 108 and the bipolar transistor 123 in the axial direction.

The sensor connection portion 122 is provided and the microcomputer 114 is mounted in a region on the rear side of the first capacitor 126 and the second capacitor 127 on the board 102 in the axial direction. The sensor connection portion 122 includes five sets of a through hole and a land. A first set is a set of a first signal H1 through hole 122a1 and a land 122a2. A second set is a set of a second signal H2 through hole 122c1 and a land 122c2. A third set is a set of a third signal H3 through hole 122d1 and a land 122d2. A fourth set is a set of a GND through hole 122b1 and a land 122b2. A fifth set is a set of a 5 V power supply through hole 122e1 and a land 122e2. The five sets described above are arranged side by side in the axial direction in the end portion of the board 102 in the Y axis direction.

Six bipolar transistors 125 are mounted in a region on the rear side of the microcomputer 114 and the sensor connection portion 122 on the board 102 in the axial direction. The six bipolar transistors 125 described above constitute a part of the motor drive circuit 105.

On the board 102, a region on the rear side of the six bipolar transistors 125 in the axial direction is the end portion of the board 102 on the rear side. The motor power supply output portion 121 is disposed in the end portion on the rear side. The motor power supply output portion 121 has three sets of a through hole and a land. A first set is a set of a U-phase through hole 121Ua and a land 121Ub in the three-phase AC power supply. A second set is a set of a W-phase through hole 121Wa and a land 121Wb. A third set is a set of a V-phase through hole 121Va and a land 121Vb. Each of the three sets described above are individual output portions outputting power supplies having phases different from each other.

As illustrated in FIG. 13, the second capacitor 127, of the plurality of electronic components mounted on the board 102, having the maximum thickness is mounted on the first surface of the board 102. As illustrated in FIG. 4, the control board 101 is disposed in a posture in which the first surface (mounting surface), of the first surface and the second surface of the board 102, of the second capacitor (127 in FIG. 13) is directed to the side of the motor unit 10.

Hereinafter, the terminal 17Ub of the bus bar 17U, the terminal 17Wb of the bus bar 17W, and the terminal 17Vb of the bus bar 17V illustrated in FIG. 8 will be collectively referred to as "bus bar terminals". In addition, the insertion portion 132Ua of the U-phase power supply output wiring 132U, the insertion portion 132Wa of the W-phase power supply output wiring 132W, and the insertion portion 132Va of the V-phase power supply output wiring 132V will be collectively referred to as "power supply output wiring insertion portions". In addition, the terminal portion 132Ub of the U-phase power supply output wiring 132U, the terminal portion 132Wb of the W-phase power supply output wiring 132W, and the terminal portion 132Vb of the V-phase power supply output wiring 132V will be collectively referred to as "power supply output wiring terminal portions".

<Operation Effects of Electric Oil Pump 1>

(1) The electric oil pump 1 includes the pump unit 40, the motor unit 10 which drives the pump unit 40, the control board 101 which has the motor drive circuit 105 controlling driving of the motor 11 of the motor unit 10, and the connector 199 to which the ignition power supply serving as an external power supply is connected. The motor 11 includes the main body portion having the rotor 20 and the stator 22, and the shaft 13 serving as a motor shaft. The front side of the shaft 13 in the axial direction protrudes from the front side of the main body portion in the axial direction and is connected to the pump unit 40. The main body portion of the motor unit 10 includes the rotation angle sensor 15 for detecting a rotation angle of the rotor 20. The control board 101 includes the sensor connection portion 122 electrically connected to the rotation angle sensor 15, the power supply input portion 120, and the motor power supply output portion 121 and is disposed on the outward side of the motor unit 10 in the radial direction in a posture in which the first surface of the first surface and the second surface of the control board 101 lies in the axial direction. The rotation angle sensor 15 is disposed on the rear side of the control board 101 in the axial direction. The power supply input portion 120 is disposed in an end portion of the control board 101 on the rear side in the axial direction. The main body portion of the motor 11 includes the control board 101 and the second wiring unit 160 electrically connecting the connector 199 and the rotation angle sensor 15 to each other. The second wiring unit 160 includes the four power supply input wirings 162, the five sensor wirings 163, and the wiring holder 161. The four power supply input wirings 162 connect the terminals of the terminal portion 199a of the connector 199 and the power supply input portion 120 on the control board 101 to each other. The five sensor wirings 163 connect the rotation angle sensor 15 and the sensor connection portion 122 on the control board 101 to each other. The wiring holder 161 is molded into a predetermined shape and holds the four power supply input wirings 162 and the five sensor wirings 163.

In the electric oil pump 1 having such a constitution, an installation space for the control board 101 disposed on the outward side of the motor unit 10 in the radial direction is maintained at an added value of the thickness of the board 102 and the thicknesses of the electronic components mounted on the board 102. The electric oil pump 1 having such a constitution differs from the constitution in the related art having the control board 101 disposed in a posture in which the board surface of the control board 101 lies in the radial direction. In the electric oil pump 1, the control board 101 does not protrude significantly outward in the radial direction from the motor unit 10. Thus, according to the electric oil pump 1, space saving can be achieved.

In addition, in the electric oil pump 1, the rotation angle sensor 15 disposed on the rear side of the control board 101 in the axial direction is not covered by the control board 101. An operator can perform maintenance and inspection of the rotation angle sensor 15 without detaching the control board 101 from the electric oil pump 1. Thus, according to the electric oil pump 1, maintenance workability can be improved.

In the electric oil pump 1, an operator can easily perform work of electrical connection using the second wiring unit 160.

Moreover, in the electric oil pump 1, the second wiring unit 160 integrally holds the four power supply input wirings 162 and the five sensor wirings 163 using the wiring holder 161. Accordingly, in the electric oil pump 1, compared to a constitution in which the four power supply input wirings 162 and the five sensor wirings 163 are individually held, space saving can be achieved for the wiring space.

(2) The rotation angle sensor 15 of the electric oil pump 1 includes the sensor substrate 15a in which the electronic components are mounted. The sensor substrate 15a is disposed in the end portion of the main body portion of the motor 11 on the rear side in the axial direction in a posture in which any one surface of both surfaces of the sensor substrate 15a lies in the radial direction.

In the electric oil pump 1, an installation space for the rotation angle sensor 15 in the axial direction is maintained at an added value of the thickness of the sensor substrate 15a and the thicknesses of the electronic components mounted in the sensor substrate 15a. Thus, according to the electric oil pump 1, compared to a constitution in which the sensor substrate 15a is disposed in a posture in which the substrate surface of the sensor substrate 15a lies in the axial direction, the size of the main body portion of the motor 11 in the axial direction can be reduced.

(3) The control board 101 of the electric oil pump 1 includes the board 102 and the electronic components mounted on the board 102. The five sensor wirings 163 and the four power supply input wirings 162 are constituted of metal plates. The connector 199 is held by the four power supply input wirings 162.

According to the electric oil pump 1 having such a constitution, since the four power supply input wirings 162 constituted of metal plates also serve as a holding means for holding the connector 199, space saving and cost reduction can be achieved.

(4) The connector 199 of the electric oil pump 1 includes the terminal portion 199a having four terminals independent from each other. The power supply input portion 120 on the control board 101 includes four connection portions (sets of a through hole and a land) independently electrically connected to each of the four terminals of the connector 199. The sensor substrate 15a includes the five sensor terminals (15a1 and 15b to 15f) electrically connected to the control board 101. The sensor connection portion 122 on the control board 101 includes five connection portions (sets of a through hole and a land) electrically connected to the five respective sensor terminals (15b to 15f) of the sensor substrate 15a. The second wiring unit 160 includes the four power supply input wirings 162 respectively connecting the four connection portions in the power supply input portion 120 on the control board 101 and the four terminals in the terminal portion 199a of the connector 199 to each other, and the five sensor wirings 163 respectively connecting the five sensor terminals (15b to 15f) of the rotation angle sensor 15 and the five connection portions in the sensor connection portion 122 on the control board 101 to each other. The wiring holder 161 of the second wiring unit 160 holds the four power supply input wirings 162 and the five sensor wirings 163 on the rear side in the axial direction while restricting movement of each thereof.

In the electric oil pump 1 having such a constitution, the wiring holder 161 of the second wiring unit 160 holds the four power supply input wirings and the five sensor wirings such that they cannot move. Accordingly, according to the electric oil pump 1, workability of electrical connection between each of the wirings described above and the power supply input portion 120 on the control board 101 and the sensor connection portion 122 is improved, so that productivity of the electric oil pump 1 can be improved.

(5) Each of the four connection portions (sets of a through hole and a land) in the power supply input portion 120 of the electric oil pump 1 is disposed on the control board 101 in a form of being arranged in a direction along a surface of the board 102 of the control board 101. The four terminals in the terminal portion 199a of the connector 199 are disposed in a form of being arranged in the same direction as the four connection portions of the power supply input portion 120. Each of the five sensor terminals (15b to 15f) of the sensor substrate 15a is disposed in the sensor substrate 15a in a form of being arranged in the same direction as the four connection portions of the power supply input portion 120. The wiring holder 161 of the second wiring unit 160 holds each of the four power supply input wirings 162 and each of the five sensor wirings 163 in a bundle on the rear side in the axial direction in a form of being arranged in the same direction as the four connection portions of the power supply input portion 120.

In the electric oil pump 1 having such a constitution, the five sensor wirings 163 and the four power supply input wirings 162 are disposed on the rear side of the control board 101 in the axial direction in a simple wiring pattern in which they do not intersect each other. Thus, according to the electric oil pump 1, it is possible to avoid increase of the control board 101 in size in the thickness direction due to the foregoing wirings intersecting each other on the rear side of the control board 101 in the axial direction.

(6) The motor power supply output portion 121 of the electric oil pump 1 includes three individual output portions (sets of a through hole and a land) outputting three-phase power supplies different from each other. Each of the three individual output portions is disposed in the end portion of the control board 101 on the front side in the axial direction in a form of being arranged in the same direction as the plurality of connection portions (lands and through holes) of the power supply input portion 120. The sensor connection portion on the control board 101 is disposed between the power supply input portion 120 and the motor power supply output portion 121 in the axial direction.

In the electric oil pump 1 having such a constitution, regarding a flow of a power supply within the board 102 input to the power supply input portion 120 on the control board 101, it is possible to employ a board wiring pattern for realizing the following matters. That is, it is possible to employ a board wiring pattern in which a route going back from the front side toward the rear side in the axial direction is not provided or the route is minimized during a process from the power supply input portion 120 to the motor power supply output portion 121. Thus, according to the electric oil pump 1, size reduction (area reduction) of the control board 101 can be achieved by reducing the total extension of the board wiring pattern.

(7) In the electric oil pump 1, each of the five connection portions (sets of a through hole and a land) in the sensor connection portion 122 on the control board 101 is disposed on the control board 101 in a form of being arranged in the axial direction. The wiring holder 161 of the second wiring unit 160 holds the five sensor wirings 163 on the front side in the axial direction in a form of being arranged in the thickness direction of the board 102 of the control board 101.

According to the electric oil pump 1 having such a constitution, since the five connection portions in the sensor connection portion 122 on the control board 101 are arranged in the axial direction, the size of the control board 101 in a direction orthogonal to the axial direction can be reduced.

In addition, in the electric oil pump 1, the wiring holder 161 holds the five sensor wirings 163 in a three-dimensional manner on the front side of the second wiring unit 160 in the axial direction in a form of being arranged in the thickness direction of the board 102. In such a constitution, the following matters can be realized without employing a constitution in which any of the five sensor wirings 163 bypasses in the board surface direction in order to avoid buffering with other sensor wirings on the front side of the second wiring unit 160 in the axial direction. That is, in the electric oil pump 1, without employing the constitution described above, the five sensor wirings 163 can be connected to the five connection portions of the sensor connection portion 122 arranged in the axial direction. Thus, according to the electric oil pump 1, the wiring patterns of the five sensor wirings 163 on the front side of the second wiring unit 160 in the axial direction can be simplified.

(8) In the electric oil pump 1, the second capacitor 127, of the electronic components mounted on the control board 101, having the largest size in a board thickness direction of the control board 101 is mounted on the first surface of the board 102 of the control board 101. The control board 101 is disposed in a posture in which the first surface is directed to a side of the motor unit 10. The front side of the wiring holder 161 of the second wiring unit 160 in the in the axial direction is disposed between the first surface and the motor unit 10 in the radial direction.

In the electric oil pump 1 having such a constitution, a space (dead space) is generated between the first surface of the board 102 and the motor unit 10 in a region in which the second capacitor 127 having the maximum thickness is not present. According to the electric oil pump 1, the size of the electric oil pump 1 can be reduced by utilizing the region described above as a space in which the five sensor wirings 163 are disposed.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric oil pump comprising:
    a pump;
    a motor to drive the pump;
    a control board including a drive circuit to control driving the motor; and
    a connector to which an external power supply is connected; wherein
    the motor includes a main body including a rotor and a stator, and a motor shaft;
    one side of the motor shaft in an axial direction protrudes from one side of the main body in the axial direction and is connected to the pump;
    the main body includes a rotation angle sensor to detect a rotation angle of the rotor;
    the control board includes a sensor connection portion electrically connected to the rotation angle sensor, a power supply input portion, and a motor power supply output portion;
    the control board is disposed on an outward side of the motor in a radial direction in a posture in which any one surface of a first surface and a second surface of the control board lies in the axial direction;
    the rotation angle sensor located away from a side of the control board in the axial direction;
    the power supply input portion is disposed in an end portion of the control board on the side of the control board;
    the main body includes a wiring assembly, and the wiring assembly electrically connects the control board, the connector, and the rotation angle sensor to each other;
    the wiring assembly includes a power supply input wiring connecting a terminal of the connector and the power supply input portion on the control board to each other, a sensor wiring connecting the rotation angle sensor and the sensor connection portion on the control board to each other, and a wiring holder molded into a predetermined shape and holding the power supply input wiring and the sensor wiring;
    at least a portion of the wiring holder is spaced away from and located between both the control board and the stator;
    the rotation angle sensor includes a sensor substrate in which an electronic component is mounted;
    the sensor substrate is disposed in an end portion of the main body on another side in the axial direction in a posture in which any one surface of both surfaces of the sensor substrate lies in the radial direction;
    the control board includes a board and electronic components mounted on the board;
    the sensor wiring and the power supply input wiring include metal plates;
    the connector is held by the power supply input wiring;

the connector includes a plurality of terminals independent from each other;

the power supply input portion on the control board includes a plurality of connection portions independently electrically connected to each of the plurality of terminals;

the sensor substrate includes a plurality of sensor terminals electrically connected to the control board;

the sensor connection portion on the control board includes a plurality of connection portions electrically connected to the plurality of respective sensor terminals of the sensor substrate;

the wiring assembly includes a plurality of power supply input wirings respectively connecting the plurality of connection portions in the power supply input portion on the control board and the plurality of terminals of the connector to each other, and a plurality of sensor wirings respectively connecting the plurality of sensor terminals of the sensor substrate and the plurality of connection portions in the sensor connection portion on the control board to each other;

the wiring holder holds the plurality of power supply input wirings and the plurality of sensor wirings on the other side in the axial direction while restricting movement of each thereof;

each of the plurality of connection portions in the power supply input portion is disposed on the control board positioned in a direction along a board surface of the control board;

the plurality of terminals of the connector are disposed in the same direction as the plurality of connection portions of the power supply input portion;

each of the plurality of sensor terminals of the sensor substrate is disposed in the sensor substrate in the same direction as the plurality of connection portions of the power supply input portion;

the wiring holder holds each of the plurality of power supply input wirings and each of the plurality of sensor wirings in a bundle on the other side in the axial direction in the same direction as the plurality of connection portions of the power supply input portion;

the motor power supply output portion includes a plurality of individual output portions to output power supplies having phases different from each other;

each of the plurality of individual output portions is disposed in an end portion of the control board on one side in the axial direction in the same direction as the plurality of connection portions of the power supply input portion; and the sensor connection portion on the control board is between the power supply input portion and the motor power supply output portion in the axial direction.

2. The electric oil pump according to claim 1, wherein each of the plurality of connection portions in the sensor connection portion on the control board is disposed on the control board and arranged in the axial direction; and one side of the wiring holder in the axial direction holds the plurality of sensor wirings in a thickness direction of the control board.

3. The electric oil pump according to claim 2, wherein an electronic component of the electronic components mounted on the control board having a largest size in a board thickness direction of the control board is mounted on the first surface of the control board;

the control board is disposed such that the first surface is directed to a side of the motor; and one side of the wiring holder in the axial direction is disposed between the first surface and the motor in the radial direction.

4. The electric oil pump according to claim 1, wherein the sensor wiring of the wiring assembly includes an insertion portion with an end that is bent in the radial direction and inserted into the sensor connection portion of the control board.

* * * * *